United States Patent
Takita et al.

(10) Patent No.: US 7,607,580 B2
(45) Date of Patent: Oct. 27, 2009

(54) OBJECT SENSOR AND IC CARD READER WITH THE OBJECT SENSOR

(75) Inventors: Yukihiko Takita, Nagano (JP); Kenji Hirasawa, Nagano (JP); Shogo Momose, Nagano (JP); Yasuhiro Kitazawa, Nagano (JP)

(73) Assignee: NIDEC Sankyo Corporation, Nagano (JP)

( * ) Notice: Subject to any disclaimer, the term of this patent is extended or adjusted under 35 U.S.C. 154(b) by 620 days.

(21) Appl. No.: 10/505,927

(22) PCT Filed: Feb. 28, 2003

(86) PCT No.: PCT/JP03/02315

§ 371 (c)(1),
(2), (4) Date: Apr. 25, 2005

(87) PCT Pub. No.: WO03/085417

PCT Pub. Date: Oct. 16, 2003

(65) Prior Publication Data

US 2005/0218227 A1    Oct. 6, 2005

(30) Foreign Application Priority Data

| Mar. 1, 2002 | (JP) | ............................. 2002-056213 |
| Mar. 12, 2002 | (JP) | ............................. 2002-066291 |
| Aug. 2, 2002 | (JP) | ............................. 2002-226759 |
| Feb. 5, 2003 | (JP) | ............................. 2003-027906 |

(51) Int. Cl.
*G06K 7/08* (2006.01)
*G06K 7/00* (2006.01)

(52) U.S. Cl. .................... 235/451; 235/439; 235/440

(58) Field of Classification Search ......... 235/439–441, 235/486, 492, 451
See application file for complete search history.

(56) References Cited

U.S. PATENT DOCUMENTS 5,010,239 A * 4/1991 Mita ........................... 235/441
5,045,674 A * 9/1991 Mita et al. .................. 235/439

(Continued)

*Primary Examiner*—Thien M. Le
*Assistant Examiner*—April A Taylor
(74) *Attorney, Agent, or Firm*—Reed Smith LLP

(57) ABSTRACT

The present invention provides an object sensor configured such that excitation coils (13c and 13d) and a detection coil (12) are separately disposed, and the detection is performed in accordance with the balance between the excitation coils (13c and 13d) in a pair, a residual variation amount after the impedance due to a DC resistance part and the like has been offset and removed is obtained at high sensitivity with excellent linearity while using a small core body (11), regardless of the impedance including a DC resistance part. Additionally, the object sensor to be used as an inlet sensor is located in an appropriate position on a more upstream side than the read/write position in an insertion direction of the IC card. A contact terminal portion of the IC card is sensed whereby to detect the validity of the card inserted into the apparatus from a card insertion slot. Thereby, steady detection operations can be implemented for the presence or absence of the IC card, notwithstanding environmental temperature variations.

The invention further provides an IC card reader configured such that a plurality of inlet sensors for detecting the type of an inserted card is provided in appropriate positions more upstream than the read/write position in a card insertion direction, wherein when an unusable card or the like is inserted, a control operation of closing shutter means can be performed, thereby enabling illegal action with the card to be prevented.

20 Claims, 24 Drawing Sheets

U.S. PATENT DOCUMENTS 6,655,590 B1 * 12/2003 McFeely et al. ............. 235/451
6,702,182 B1 * 3/2004 Kanayama .................. 235/451
2002/0153420 A1 * 10/2002 Nakamura et al. .......... 235/441

* cited by examiner

OBJECT SENSOR AND IC CARD READER WITH THE OBJECT SENSOR

TECHNICAL FIELD

The present invention relates to an object sensor formed to detect the presence or absence of a detection target object; and the invention further relates to an IC card reader that has the object sensor and that records and/or reproduce information on an IC card inserted to a read/write position in an apparatus mainbody.

BACKGROUND OF THE INVENTION

In general, object sensors are widely used with a wide variety of apparatuses including apparatuses for identifying irregular surfaces and materials of coins in coin-handling apparatuses, such as automatic vending machines, automatic ticket vending machines, ATMs, and motor rotation drive control apparatuses. Generally, conventional object sensors of the aforementioned type have an eddy-current type configuration as shown in FIG. 10 for example. Electric current is applied to a coil 200 wound on a rod-shaped core body 100 whereby to generate a detecting magnetic flux $\phi r$. In a magnetic field formed by the detecting magnetic flux $\phi r$, a detection target object 300 and the core body 100 are moved relative to each other. At this event, variations take place in the magnitude of eddy currents generated by the detection target object 300 in correspondence with variations of the distance between the two, and magnetic resistance is varied. The variation amount is taken as being the amount of inductance variations thereby to obtain detection outputs, as shown in FIG. 11.

However, in the conventional object sensor, a direct current (DC) resistance part is included the magnetic resistance variations with air being interposed between the core body 100 and the detection target object 300. Accordingly, finally detected outputs are correlated with impedance variations. Consequently, in the conventional object sensor, the detection output sensitivity cannot yet be said as having reached a sufficient level. In addition, there is a problem in that high temperature characteristics cannot be obtained because of influences of factors such as temperature-caused variations in magnetic permeability of a DC resistor part.

In addition, the magnetic resistance variations in the air between the detection target object 300 and the core body 100 are proportional to the square of the distance, so that the linearity of the detection outputs is not high. Further, as is shown in FIG. 12, variations in three dimensional magnetic flux $\phi r$ are utilized to increase the variation amount thereof, so that the overall apparatus is prone to be enlarged in size. An additional problem is that since the impedance varies following the change in the length between a sensor amplifier and a cable, the amplifier should be tuned.

As another general practice, in the fields of apparatuses such as ATMs, automatic vending machines, and automatic ticket vending machines, there are widely used card readers of the type that performs recording/reproduction of specific information on an information recording section of each of various type cards. In addition, many cases are observed in which an inlet sensor for detecting, for example, the genuineness and the obverse and reverse sides of a card inserted in the apparatus mainbody is mounted in a portion immediately after or near a card insertion slot. The inlet sensor is used to perform sensing for the information recording section of the card inserted in the apparatus mainbody whereby to detect whether a correct card is inserted or whether the obverse and reverse sides of the card are not opposite even when the correct card is inserted. In this case, when an incorrect card is detected, the card is held in the state where a shutter disposed immediately after the inlet sensor or on the downstream side thereof is kept closed thereby to prevent, for example, an illegal action.

Further, in recent years, IC cards of the type in which ICs are built in a card are employed, and IC card readers have appeared, in which an IC contact is disposed detachably and attachably to a contact terminal portion of the IC card thereby to perform information read/write.

The IC card reader, which performs the information read/write on the IC card, has a card insertion slot through which a card is inserted in an apparatus mainbody; a card transport path that guides the card inserted through a card insertion slot to a card read/write position; and transport driving means that moves the card in the card transport path. The genuineness or the obverse and reverse sides of the card inserted into the card insertion opening are sensed by an inlet sensor disposed near the card insertion slot. When the card has been sensed to be correct, the card is transported by a transport driving means to an IC contact disposed detachably and attachably to the contact terminal portion of the IC card, whereby performing the information read/write thereon.

For a card reader that performs information recording/reproduction on a magnetic stripe of a magnetic card of the type generally widely used, an inlet sensor of the above-described type can be formed into a simple configuration by using a small magnetic head. However, in the case that an IC card is used as a recent card, no specific proposal has been made regarding how to detect the validity of the IC card.

In the case that an eddy-current type sensor of the type disclosed in Japanese Unexamined Patent Application Publication No. 11-352108 is used to determine an IC card, there is a problem in that thinning of the card is disabled. More specifically, in the case of the eddy-current type sensor, three or more excitation rod-shaped core bodies are disposed, so that enlargement of the apparatus cannot be averted. In addition, the magnetic permeability of the core body varies depending on the humidity thereby to cause the temperature characteristics for the usage environment to significantly vary, so that a reference value level for determining the presence or absence of the IC card should be set higher than the variation in the temperature characteristics. As such, in the case that a predetermined or larger distance occurs between the IC card and the inlet sensor, a case can occur in which detection of the IC card is disabled.

Further, for recent IC-card using card readers of the type described above, a detailed proposal regarding how to detect card types has not been made to date.

As described above, the conventional card reader has problems in that it is incapable of determining the type of a card inserted in the apparatus mainbody; that is, it is incapable of determining whether a card being used at the present time is a magnetic card or an IC card. In addition, in the case of an IC card, the card reader is incapable of determining whether the IC card is a contact IC card or contactless IC card, therefore completely disabling determining a common type of these cards, as a matter of course. As such, when, for example, an unusable card is inserted, the control operation of closing the shutter cannot be securely performed whereby to disable countermeasures to prevent from being erroneous operations, damage, and/or the like of the apparatus.

In addition, the card reader using the IC card, appropriately senses the genuineness or the obverse and reverse sides of the IC card through the inlet sensor. However, in an event that, for example, wire disconnection has occurred inside the inlet sensor or between the inlet sensor and a signal processor circuit or the like, since the IC card cannot be appropriately sensed, there arises a problem in that even a correct IC card is erroneously recognized as being an incorrect card whereby rendering it unusable. Nevertheless, in a general IC-card using card reader, wire disconnection and the like in the inlet sensor cannot be pre-detected.

Accordingly, an object of the present invention is to provide an object sensor designed into a simple configuration and to be capable of obtaining a steady detection result while obtaining favorable detection sensitivity.

Another object of the present invention is to provide an IC card reader designed to have a simple configuration and to be capable of performing an excellent detection of an IC card.

Still another object of the present invention is to provide an IC card reader designed to have a simple, small configuration and to be capable of performing a secure, steady detection of the type of an inserted IC card whereby to enable favorably preventing, for example, erroneous operations and damage.

Yet another object of the present invention is to provide an IC card reader designed to be capable of performing appropriate processing by detecting wire disconnection and the like in an inlet sensor before sensing card genuineness.

SUMMARY OF THE INVENTION

In order to achieve the objects described above, in an object sensor according to a $1^{st}$ embodiment of the invention, an excitation coil and a detection coil are mounted by being individually wound on a same axial center of a core body; one side of the excitation coil and the detection coil is mounted in a central core portion located in a substantially center in the axial direction of the core body, and the other side of the excitation coil is mounted on individual axial-end core portions in a pair located in both end portions of the core body in the axial direction; and one side of the axial-end core portion in the pair and the detection target object have a locational relationship to be mutually faceable.

More specifically, in the object sensor having the above-described configuration, the excitation coils and the detection coil are separately disposed. In addition, since the detection is performed in accordance with the balance between the excitation coils in the pair, a magnetic flux variation amount is directly measured whereby to enable a high-sensitive output to be obtained while using a small core body, regardless of the impedance including a DC resistance part and the like. Additionally, notwithstanding environmental temperature variations, a steady detection operation can be implemented without using a conventional constant-current power reduction circuit but by using a cheap circuit.

In an object sensor according to a $2^{nd}$ embodiment of the invention, the core body described in the $1^{st}$ embodiment of the invention is formed of a single plate-shaped member, so that the core body is thinly formed. This enables further miniaturization to be implemented.

In an object sensor according to a $3^{rd}$ embodiment of the invention a width dimension of the axial-end core portion, which is described the $1^{st}$ embodiment of the invention, in a direction perpendicular to the axial direction is set smaller than a width dimension of the central core portion. In an object sensor according to a $4^{th}$ embodiment of the invention, the width dimension of the axial-end core portion, which is described in claim 3, is set to be half or smaller than the width dimension of the central core portion.

As described above, the axial-end core portion to be positioned close to the detection target object is formed to have the small width. Thereby, the electric current efficiency in the axial-end core portion is improved, and even more magnetic fluxes are generated, consequently enabling the detection sensitivity to be even more improved.

Further, in an object sensor according to a $5^{th}$ embodiment of the invention, engagement flange portions protruding in the width direction are individually provided in individual boundary portions between the central core portion described in the $3^{rd}$ embodiment of the invention and the axial-end core portion in the pair; and winding positions of the excitation coil and the detection coil are positioned and regulated by the engagement flange portions to a predetermined position.

In the case that the engagement flange portions are thus provided in the boundary portions between the central core portion and the axial-end core portions whereby to enable the winding positions of the individual coils to be accurately positioned, to enable phase differences and output differences to be reduced, and to enable a high variation rate to be obtained.

In an object sensor according to a $6^{th}$ embodiment of the invention, a comparison metal body is located to oppose the axial-end core portion, which is one of the axial-end core portions described the $3^{rd}$ embodiment of the invention in the pair, in the axial-end core portion on the opposite side of the side located faceably with the side of the IC card as the detection target object. In the case that the detection is performed by using as a variation amount the differential between the detection output from the detection target object and the detection output from the comparison metal body, an initiation point position in a detection range necessary for the detection target object can be used by being set to a "0" output by changing the distance between the comparison metal body and the axial-end core section, the material of the comparison metal body, and the like. Consequently, the detection accuracy, resolution capability, and linearity can be enhanced by obtaining a significant output variation.

Further, in an object sensor according to a $7^{th}$ embodiment of the invention, the excitation coil described in the $1^{st}$ embodiment of the invention comprises coil winding portions in a pair; and the coil winding portions in the pair are located to form opposed magnetic fields on the same axial center. According to such means as described above, one output can be obtained, so that the detection can be implemented with even higher sensitivity and accuracy.

In an IC card reader according to an $8^{th}$ embodiment of the invention, an inlet sensor for sensing the contact terminal portion of the IC card to detect validity of each inserted card by detecting the contact terminal portion of the IC card is provided in an appropriate position on a more upstream side than the read/write position in an insertion direction of the IC card. According to the IC card reader having the configuration described above, the validity of the card can be easily and securely detected.

According to an IC card reader according to a $9^{th}$ embodiment of the invention, in the apparatus mainbody described in the $8^{th}$ embodiment; of the invention, there are provided an card insertion slot into which the IC card is inserted, a card transport path for guiding the IC card inserted through the card insertion slot to the read/write position, transport driving means for moving the IC card present in the card transport path, and shutter means for closing/opening the card transport path on a downstream side of the card insertion slot in the insertion direction of the IC card, wherein the inlet sensor is located between the card insertion slot and the shutter means. Accordingly, the IC card inserted from the card insertion slot is fed into the card transport path after the shutter means is set to an opened state through the detection by the inlet sensor.

In an IC card reader according to a $10^{th}$ embodiment of the invention, the inlet sensor described in the $8^{th}$ embodiment of the invention is located in an appropriate positional relationship with the contact terminal portion to be able to sense obverse and reverse sides of the IC card. Accordingly, in addition to the validity of the card, the obverse and reverse sides of the IC card can be easily and securely detected.

Further, in an IC card reader according to an 11$^{th}$ embodiment of the invention, the inlet sensor described in the 9$^{th}$ embodiment; of the invention is mounted in a position spaced away from the card transport path. This prevents the inlet sensor from being damaged, for example, dust entered into the apparatus, the IC card, and the like.

In an IC card reader according to a 12$^{th}$ embodiment of the invention, a distance between a gap center of a magnetic head provided to sense a magnetic information record section and the inlet sensor described in the 8$^{th}$ embodiment of the invention is set substantially equal to a distance from a leading edge position of the IC card in the insertion direction to the contact terminal portion. Accordingly, the card having the magnetic information record section is smoothly detected.

Further, in an IC card reader according to a 13$^{th}$ embodiment of the invention, the inlet sensor described in the 8$^{th}$ embodiment of the invention is configured into a magnetic differential type wherein an excitation coil and a detection coil are mounted by being individually wound on a same axial center of a core body; one side of the excitation coil and the detection coil is mounted in a central core portion located in a substantially center in the axial direction of the core body, and the other side of the excitation coil is mounted on individual axial-end core portions in a pair located in both end portions of the core body in the axial direction; and one side of the axial-end core portions in the pair and the detection target object have a locational relationship to be mutually faceable.

More specifically, in the magnetic differential inlet sensor having the above-described configuration, the excitation coils and the detection coil are separately disposed. In addition, since the detection is performed in accordance with the balance between excitation coils in a pair or detection coils in a pair, a magnetic flux variation amount is directly measured whereby to enable a high-sensitive output to be obtained while using a small core body, regardless of the impedance including a DC resistance part and the like. Additionally, notwithstanding environmental temperature variations, a steady detection operation can be implemented without using a conventional constant-current power reduction circuit by using a cheap circuit.

In an IC card reader according to a 14$^{th}$ embodiment of the invention, the core body described in the 13$^{th}$ embodiment of the invention is formed of a single plate-shaped member, so that the core body is thinly formed. This enables further miniaturization to be implemented.

In an IC card reader aeeording to a 15$^{th}$ embodiment of the invention, a width dimension of the axial-end core portion, which is described in the 13$^{th}$ embodiment of the invention, in a direction perpendicular to the axial direction is set smaller than a width dimension of the central core portion. In an IC card reader according to a 16$^{th}$ embodiment of the invention the width dimension of the axial-end core portion, which is described the 15$^{th}$ embodiment of the invention, is set to be half or smaller than the width dimension of the central core portion.

As described above, the axial-end core portion to be positioned close to the detection target object is formed to be small in width. Thereby, the electric current efficiency in the axial-end core portion is improved, and even more magnetic fluxes are generated, consequently enabling the detection sensitivity to be improved further.

Further, in an IC card reader according to a 17$^{th}$ embodiment of the investigation, engagment flange portion protruding in the width direction are individually provided in individual boundary portions between the central core portion described in the 15$^{th}$ embodiment of the invention and the axial-end core portion in the pair; and winding positions of the excitation coil and the detection coil are positioned and regulated by the engagement flange portions to a predetermined position.

In the case that the engagement flange portions are thus provided in the boundary portions between the central core portion and the axial-end core portions whereby to enable the winding positions of the individual coils to be accurately positioned, phase differences and output differences are reduced, and a high variation rate can be obtained.

In an IC card reader according to an 18$^{th}$ embodiment of the invention, a comparison metal body is located to oppose the axial-end core portion, which is one of the axial-end core portions in the pair described in the 15$^{th}$ embodiment of the invention in the axial-end core portion on the opposite side of the side located faceably with the side of the IC card as the detection target object.

In the case that the detection is performed by using as a variation amount the differential between the detection output from the IC card as the detection target object and the detection output from the comparison metal body, an initiation point position in a detection range necessary for the detection target object can be used by being set to a "0" output by changing the distance between the comparison metal body and the axial-end core section, the material of the comparison metal body, and the like. Consequently, the detection accuracy, resolution capability, and linearity can be enhanced by obtaining a significant output variation.

Further, in an IC card reader according to a 19$^{th}$ embodiment of the invention the excitation coil described in the 13$^{th}$ embodiment of the invention comprises coil winding portions in a. pair; and the coil winding portions in the pair are located to form opposed magnetic fields on the same axial center. According to such means as described above, one output can be obtained, so that the detection can be implemented with even higher sensitivity and accuracy.

In order to achieve the objects described above, in an IC card reader according to a 20$^{th}$ embodiment of the invention, an inlet sensor detecting the type of each inserted card is provided in an appropriate position on a more upstream side than the read/write position in an insertion direction of the card. Accordingly, a control operation to close the shutter, for example, can be implemented by using a detection signal from the inlet sensor when an unusable card is inserted.

In an IC card reader according to a 21$^{st}$ embodiment of the invention, the inlet sensor described in 20$^{th}$ embodiment of the invention comprises at least two magnetic sensors of a first magnetic sensor for detecting a magnetic stripe of a magnetic card, a second magnetic sensor for detecting a contact terminal portion of a contact IC card, and a third magnetic sensor for detecting an antenna section of a contactless IC card.

Consequently, according to the 21$^{st}$ embodiment of the invention, whether a card inserted is a magnetic card, a contact IC card, a contactless IC card, or a card common with any of these cards can be efficiently performed in accordance with a detection signal from the inlet sensor.

Further, in an IC card reader according to a 22$^{nd}$ embodiment of the invention, in the apparatus mainbody described in the 20$^{th}$ embodiment of the invention, there are provided an card insertion slot into which the card is inserted, a card transport path for guiding the card inserted through the card insertion slot to the read/write position, transport driving means for moving the card present in the card transport path, and shutter means for closing/opening the card transport path on a downstream side of the card insertion slot in the insertion direction of the card, wherein the inlet sensor is located between the card insertion slot and the shutter means.

Accordingly, according to the $22^{nd}$ embodiment of the invention. the IC card inserted from the card insertion slot is fed into the card transport path after the shutter means is set to an opened state through the detection by the inlet sensor.

Further, in an IC card reader according to a $23^{rd}$ embodiment of the invention, at least one of the inlet sensors described in the $20^{th}$ embodiment of the invention is configured into a magnetic differential type wherein an excitation coil and a detection coil are mounted by being individually wound on a same axial center of a core body; one side of the excitation coil and the detection coil is mounted in a central core portion located in a substantially center in the axial direction of the core body, and the other side of the excitation coil is mounted on individual axial-end core portions in a pair located in both end portions of the core body in the axial direction; and one side of the axial-end core portions in the pair and the detection target object have a locational relationship to be mutually faceable.

More specifically, in the magnetic differential inlet sensor used in the IC card reader having the above-described configuration, the excitation coils and the detection coil are separately disposed. In addition, since the detection is performed in accordance with the balance between excitation coils in-a pair or detection coils in a pair, a magnetic flux variation amount is directly measured whereby to enable a high-sensitive output to be obtained while using a small core body, regardless of the impedance including a DC resistance part and the like. Additionally, notwithstanding environmental temperature variations, a steady detection operation can be implemented without using a conventional constant-current power reduction circuit but by using a cheap circuit.

Further, in an IC card reader according to a $24^{th}$ embodiment of the invention, the core body described in the $23^{rd}$ embodiment of the invention is formed of a single plate-shaped member, so that the core body is thinly formed. This enables further miniaturization to be implemented.

In an IC card reader according to a $25^{th}$ embodiment of the invention, a width dimension of the axial-end core portion, which is described in the $23^{rd}$ embodiment of the invention, in a direction perpendicular to the axial direction is set smaller than a width dimension of the central core portion. In an IC card reader according to a $26^{th}$ embodiment of the invention, the width dimension of the axial-end core portion, which is described in the $25^{th}$ embodiment of the invention, is set to be half or smaller than the width dimension of the central core portion.

As described above, the axial-end core portion to be positioned close to the detection target object is formed to have the small width. Thereby, the electric current efficiency in the axial-end core portion is improved, and even more magnetic fluxes are generated, consequently enabling the detection sensitivity to be even more improved.

Further, in an IC card reader according to a $27^{th}$ embodiment of the invention, engagement flange portions protruding in the width direction are individually provided in individual boundary portions between the central core portion described in the $25^{th}$ embodiment of the invention and the axial-end core portion in the pair; and winding positions of the excitation coil and the detection coil are positioned and regulated by the engagement flange portions to a predetermined position.

In the case that the engagement flange portions are thus provided in the boundary portions between the central core portion and the axial-end core portions whereby to enable the winding positions of the individual coils to be accurately positioned, phase differences and output differences are reduced, and a high variation rate can be obtained.

Further, in an IC card reader according to a $28^{th}$ embodiment of the invention, a comparison metal body is located to oppose the axial-end core portion, which is one of the axial-end core portions in the pair described in the $25^{th}$ embodiment of the invention, in the axial-end core portion on the opposite side of the side located faceably with the side of the IC card as the detection target object.

In the case that the detection is performed by using as a variation amount the differential between the detection output from the card as the detection target object and the detection output from the comparison metal body, an initiation point position in a detection range necessary for the detection target object can be used by being set to a "0" output by changing the distance between the comparison metal body and the axial-end core section, the material of the comparison metal body, and the like. Consequently, the detection accuracy, resolution capability, and linearity can be enhanced by obtaining a significant output variation.

Further, in an IC card reader according to a $29^{th}$ embodiment of the invention, the excitation coil described in the $23^{rd}$ embodiment of the invention comprises coil winding portions in a pair; and the coil winding portions in the pair are located to form opposed magnetic fields on the same axial center. According to such means as described above, one output can be obtained, so that the detection can be implemented with even higher sensitivity and accuracy.

In addition, in order to achieve the objects described above, in an IC card reader according to a $30^{th}$ embodiment of the invention, in a position on an inlet side of the card transport path, an inlet sensor configured into a magnetic differential type comprising excitation coils in a pair and a detection coil that are wound on magnetic cores is provided; the IC card is transported by transport driving means to read/write position when the inlet sensor has sensed the contact terminal portion of the IC card; and wire-disconnection diagnostic means that, when the inlet sensor is not sensing the contact terminal portion of the IC card, excites the excitation coil and performs diagnosis of wire disconnection in the inlet sensor or the like in accordance with a voltage value of an output signal that is output from the detection coil. Thereby, wire disconnection or the like in the inlet sensor is detected in advance.

In an IC card reader according to a $31^{st}$ embodiment of the invention, the inlet sensor described in the $30^{th}$ embodiment of the invention is configured into a magnetic differential type wherein the excitation coils in the pair and the detection coil are mounted by being individually wound on a same axial center of a core body; one side of the excitation coil and the detection coil is mounted in a central core portion located in a substantially center in the axial direction of the core body, and the other side of the excitation coil is mounted on individual axial-end core portions in a pair located in both end portions of the core body in the axial direction; and one side of the axial-end core portions in the pair and the detection target object have a locational relationship to be mutually faceable.

More specifically, in the magnetic differential inlet sensor used in the IC card reader having the above-described configuration, the excitation coils and the detection coil are separately disposed. In addition, since the detection is performed in accordance with the balance between excitation coils in a pair or detection coils in a pair, a magnetic flux variation amount is directly measured whereby to enable a high-sensitive output to be obtained while using a small core body, regardless of the impedance including a DC resistance part and the like. Additionally, notwithstanding environmental temperature variations, a steady detection operation can be implemented.

Further, in an IC card reader according to a $32^{nd}$ embodiment of the invention, the wire-disconnection diagnostic means described in $30^{th}$ embodiment of the invention causes the excitation coils to be excited when the contact terminal portion is not sensed, and uses a comparator to compare a voltage value of an output signal output from the detection coil and the reference voltage whereby to determine wire disconnection or the like in, for example, the excitation coil or the detection coil.

Further, in an IC card reader according to a $33^{rd}$ embodiment of the invention, the wire-disconnection diagnostic means described in the $30^{th}$ embodiment of the invention performs diagnosis of wire disconnection in one of the excitation coils in the pair when the output level of the detection coil has exceeded the predetermined reference level. Thereby, a wire disconnection location in the inlet sensor or the like can be identified.

In an IC card reader according to a $34^{th}$ embodiment of the invention, the wire-disconnection diagnostic means described in the $30^{th}$ embodiment of the invention performs diagnosis of wire disconnection or the like by exciting the excitation coils after information read/write is performed on the IC card and the IC card is ejected. Thereby, wire disconnection in the inlet sensor can be detected in advance until the genuineness or obverse and reverse sides of a subsequent IC card is detected.

Further, in an IC card reader according to a $35^{th}$ embodiment of the invention, the wire-disconnection diagnostic means described in the $30^{th}$ embodiment of the invention performs diagnosis of wire disconnection or the like in the sensor by exciting the excitation coils before the inlet sensor detects the contact terminal portion of the IC card after the IC card is inserted into an inlet of the card transport path. Thereby, wire disconnection or the like in the inlet sensor can be detected in advance before the inlet sensor senses the genuineness or the obverse and reverse sides of the IC card.

Further, in an IC card reader according to a $36^{th}$ embodiment of the invention, wherein in the inlet sensor described in the $30^{th}$ embodiment of the invention, the excitation coils in the pair or the axial-end core portions in the pair are configured unbalanced, and wire disconnection or the like in the detection coil is diagnosed when smaller than a standby voltage from the detection coil that is output in an event that the excitation coils are excited Thereby, wire disconnection in both the excitation coil in the pair or detection coil is detected by comparison with a low standby voltage.

As described above, the object sensor described in the $1^{st}$ embodiment of the invention is configured such that the excitation coils and the detection coil are separately disposed, and the detection is performed in accordance with the balance between the excitation coils in the pair, a residual variation amount after the impedance due to a DC resistance part and the like has been offset and removed is obtained at high sensitivity with excellent linearity while using a small core body, regardless of the impedance including a DC resistance part. Additionally, notwithstanding environmental temperature variations, a steady detection operation can be implemented without using a conventional constant-current power reduction circuit but by using a cheap circuit. With the simple configuration, steady detection results can be obtained while obtaining high detection sensitivity regarding the presence or absence of the detection target object. Consequently, the performance and reliability of the IC card can be improved.

The object sensor according to the $2^{nd}$ embodiment of the invention is configured such that the core body is formed of a single plate-shaped member, so that the core body is thinly formed. Accordingly, further miniaturization can be implemented, in addition to the effects described above.

The object sensor described in each of the $3^{rd}$ and $4^{th}$ embodiments of the invention is configured such that a width dimension of the axial-end core portion to be positioned close to the detection target object is set small. Thereby, the electric current efficiency in the axial-end core portion is improved, and even more magnetic fluxes are collected, consequently enabling the detection sensitivity to be even more improved. Accordingly, the above-described effects can be further improved.

Further, the object sensor according to the $5^{th}$ embodiment of the invention is configured such that engagement flange portions are provided in the boundary portions between the central core portion and the axial-end core portions whereby to enable the winding positions of the individual coils to be accurately positioned, to enable phase differences and output differences to be reduced, and to enable a high variation rate to be obtained. Accordingly, the above-described effects can be further improved.

The object sensor according to the $6^{th}$ embodiment of the invention is configured such that the detection is performed by using as a variation amount the differential between the detection output from the detection target object and the detection output from the comparison metal body, an initiation point position in a detection range necessary for the detection target object can be used by being set to a "0" output by changing the distance between the comparison metal body and the axial-end core section, the material of the comparison metal body, and the like. Consequently, the detection accuracy, resolution capability, and linearity can be enhanced by obtaining a significant output variation. Accordingly, the above-described effects can be further improved. Further, the object sensor according to the $7^{th}$ embodiment of the invention is configured such that the opposed magnetic fields are formed by the excitation coils in the pair. Thereby, the output is made to be an ideal differential state, thereby enabling the detection to be implemented with even higher sensitivity and accuracy. Accordingly, the above-described effects can be further improved.

The IC card reader according to $8^{th}$ embodiment of the invention is configured such that an inlet sensor for sensing the contact terminal portion of the IC card to detect validity of each inserted card by detecting the contact terminal portion of the IC card is provided in an appropriate position on a more upstream side than the read/write position in an insertion direction of the IC card. With the inlet sensor for sensing the contact terminal portion of the IC card, the validity of the card can be easily and securely detected, consequently enabling reliability of the IC card reader to be improved.

The IC card reader according to the $9^{th}$ embodiment of the invention is configured such that in the apparatus mainbody described the $8^{th}$ embodiment of the invention, there are provided a card transport path for guiding the IC card inserted through a card insertion slot to the read/write position, and shutter means for closing/opening the card transport path, wherein the inlet sensor is located between the card insertion slot and the shutter means. Thereby, the IC card inserted from the card insertion slot is fed into the card transport path after the IC card is sensed by the lead sensor. Accordingly, in addition to the above-described effects, rejection of an illegal card can be securely performed by using the shutter means, and the cleanliness in the apparatus mainbody can be satisfactorily maintained.

Further, the IC card reader according to the 10$^{th}$ embodiment of the invention of the present invention is configured such that the inlet sensor described in the 8$^{th}$ embodiment of the invention is located in an appropriate positional relationship with the contact terminal portion to be able to sense obverse and reverse sides of the IC card. Accordingly, in addition to the validity of the card, the obverse and reverse sides of the IC card can be easily and securely detected. Consequently, the above-described effects can be further improved.

In addition, the IC card reader according to the 12$^{th}$ embodiment of the invention is configured such that a distance between a gap center of a magnetic head provided to sense a magnetic information record section and the inlet sensor described in the 8$^{th}$ embodiment of the invention is set substantially equal to a distance from a leading edge position of the IC card in the insertion direction to the contact terminal portion. Accordingly, the card having the magnetic information record section is smoothly detected. Consequently, similar effects can be exhibited as well for the card having the magnetic information record section.

Further, in the IC card reader according to the 13$^{th}$ embodiment of the invention, a magnetic differential inlet sensor is used as the inlet sensor described in the 8$^{th}$ embodiment of the invention thereby to enable a high-sensitive output to be obtained while using a small cote body, notwithstanding environmental temperature variations. Accordingly, in addition to the above-described effects, a steady detection of the IC card can be implemented with high detection sensitivity. Consequently, a small and high-performance IC card reader can be obtained.

Further, the IC card reader according to the 14$^{th}$ embodiment of the invention is configured such that the core body of the inlet sensor described in the 13$^{th}$ embodiment of the invention is formed of a single plate-shaped member, so that the core body is thinly formed. Accordingly, further miniaturization can be implemented, in addition to the effects described above.

Further, the IC card reader according to each of the 15$^{th}$ and 16$^{th}$ embodiments of the invention is configured such that a width dimension of the axial-end core portion described in each of the 13$^{th}$ and 14$^{th}$ embodiments of the invention is set small. Thereby, the electric current efficiency in the axial-end core portion is improved, and even more magnetic fluxes are collected, consequently enabling the detection sensitivity to be even more improved. Accordingly, the above-described effects can be further improved.

Further, the IC card reader according to the 17$^{th}$ embodiment of the invention is configured such that engagement flange portions are provided in the boundary portions between the central core portion and the axial-end core portions of the inlet sensor described in the 15$^{th}$ embodiment of the invention, whereby to enable the winding positions of the individual coils to be accurately positioned, to enable phase differences and output differences to be reduced, and to enable a high variation rate to be obtained. Accordingly, the above-described effects can be further improved.

The card reader. according to the 18$^{th}$ embodiment of the invention is configured such that the detection is performed by using as a variation amount the differential between the detection output of the inlet sensor described in the 15$^{th}$ embodiment of the invention from the IC card and the detection output from the comparison metal body, an initiation point position in a detection range necessary for the detection target object can be used by being set to a "0" output by changing the distance between the comparison metal body and the axial-end core section, the material of the comparison metal body, and the like. Consequently, the detection accuracy, resolution capability, and linearity can be enhanced by obtaining a significant output variation. Accordingly, the above-described effects can be further improved.

Further, the IC card reader according to the 19$^{th}$ embodiment of the invention is configured such that the opposed magnetic fields are formed by the excitation coils in the pair of the inlet sensor described the 13$^{th}$ embodiment of the invention, Thereby, the output is made to be an ideal differential state, thereby enabling the detection to be implemented with even higher sensitivity and accuracy. Accordingly, the above-described effects can be further improved.

The IC card reader according to the 20$^{th}$ embodiment of the invention is configured such that an inlet sensor detecting the type of each inserted card is provided in an appropriate position on a more upstream side than the read/write position in an insertion direction of the card. Accordingly, a control operation to close the shutter, for example, can be implemented by using a detection signal from the inlet sensor when an unusable card is inserted. Consequently, illegal action for cards can be prevented, thereby enabling reliability of the IC card reader to be improved.

In the IC card reader according to the 21$^{st}$ embodiment of the invention, the inlet sensor described in the 20$^{th}$ embodiment of the invention comprises at least two magnetic sensors of a first magnetic sensor for detecting a magnetic stripe of a magnetic card, a second magnetic sensor for detecting a contact terminal portion of a contact IC card, a third magnetic sensor for detecting an antenna section of a contactless IC card. Thereby, whether a card inserted is a magnetic card, a contact IC card, a contactless IC card, or a card common with any of these cards can be efficiently performed in accordance with a detection signal from the inlet sensor. Accordingly, the above-described effects can be securely obtained.

Further, in the IC card reader according to the 22$^{nd}$ embodiment of the invention, in the apparatus mainbody described in the 20$^{th}$ embodiment of the invention, there are provided an card insertion slot into which the card is inserted, a card transport path for guiding the card inserted through the card insertion slot to the read/write position, and shutter means for closing/opening the card transport path, wherein the inlet sensor is located between the card insertion slot and the shutter means. An inserted card is fed into the card transport path after the card is sensed by the lead sensor. Accordingly, in addition to the above-described effects, rejection of an illegal card can be securely performed by using the shutter means, and the cleanliness in the apparatus mainbody can be satisfactorily maintained.

Further, in the IC card reader according to the 23$^{rd}$ embodiment of the invention, a magnetic differential inlet sensor is used as the inlet sensor described in the 20$^{th}$ embodiment of the invention thereby to enable a high-sensitive output to be obtained while using a small core body, notwithstanding environmental temperature variations. Accordingly, in addition to the above-described effects, a steady detection of the IC card can be implemented with high detection sensitivity. Consequently, a small and high-performance IC card reader can be obtained.

Further, the IC card reader according to the 24$^{th}$ embodiment of the invention is configured such that the core body of the magnetic differential sensor described in the 23$^{rd}$ embodiment of the invention is formed of a single plate-shaped member, so that the core body is thinly formed. Accordingly, further miniaturization can be implemented, in addition to the effects described above.

Further, the IC card reader according to each of the 25$^{th}$ and 26$^{th}$ embodiments of the invention is configured such that a width dimension of the axial-end core portion described in each of the 23$^{rd}$ and 24$^{th}$ embodiments of the invention is set small, Thereby, the electric current efficiency in the axial-end core portion is improved, and even more magnetic fluxes are collected, consequently enabling the detection sensitivity to be even more improved. Accordingly, the above-described effects can be further improved.

Further, the IC card reader according to the 27$^{th}$ embodiment of the invention is configured such that engagement flange portions are provided in the boundary portions between the central core portion and the axial-end core portions of the magnetic differential sensor described in the 25$^{th}$ embodiment of the invention, whereby to enable the winding positions of the individual coils to be accurately positioned, to enable phase differences and output differences to be reduced, and to enable a high variation rate to be obtained. Accordingly, the above-described effects can be further improved.

The card reader according to the 28$^{th}$ embodiment of the invention is configured such that the detection is performed by using as a variation amount the differential between the detection output of the magnetic differential sensor described in the 25$^{th}$ embodiment of the invention from the card and the detection output from the comparison metal body, an initiation point position in a detection range necessary for the detection target object can be used by being set to a "0" output by changing the distance between the comparison metal body and the axial-end core section, the material of the comparison metal body, and the like. Consequently, the detection accuracy, resolution capability, arid linearity can be enhanced by obtaining a significant output variation. Accordingly, the above-described effects can be further improved.

Further, the IC card reader according to the 29$^{th}$ embodiment of the invention is configured such that the opposed magnetic fields are formed by the excitation coils in the pair of the magnetic differential sensor described in the 23$^{rd}$ embodiment of the invention. Thereby, the output is made to be an ideal differential state, thereby enabling the detection to be implemented with even higher sensitivity and accuracy. Accordingly, the above-described effects can be further improved.

In addition, in the IC card reader according to the 30$^{th}$ embodiment of the invention, in a position on an inlet side of the card transport path, an inlet sensor configured into a magnetic differential type comprising excitation coils in a pair and a detection coil that are wound on magnetic cores is provided; the IC card is transported by transport driving means to read/write position when the inlet sensor has sensed the contact terminal portion of the IC card; and wire-disconnection diagnostic means that, when the inlet sensor is not sensing the contact terminal portion of the IC card, excites the excitation coil and performs diagnosis of wire disconnection in the inlet sensor or the like in accordance with a voltage value of an output signal that is output from the detection coil. Thereby, wire disconnection or the like in the inlet sensor is detected in advance. Consequently, reliability required for the IC card reader can be significantly improved.

In the IC card reader according to the 31$^{st}$ embodiment of the invention, a magnetic differential inlet sensor is used as the inlet sensor described in the 30$^{th}$ embodiment of the invention thereby to enable a high-sensitive output to be obtained while using a small core body, notwithstanding environmental temperature variations. Accordingly, in addition to the above-described effects, a steady detection of the IC card can be implemented with high detection sensitivity. Consequently, a small and high-performance IC card reader can be obtained.

Further, in the IC card reader according to the 32$^{nd}$ embodiment of the invention the wire-disconnection diagnostic means described in the 30$^{th}$ embodiment of the invention performs diagnosis of wire disconnection in, for example, the exciting coil or the detection coil of the inlet sensor when the contact terminal portion of the IC card is not sensed. Accordingly, the detection can be performed without influencing the inherent operation of the IC card reader.

In the IC card reader according to the 33$^{rd}$ embodiment of the invention, the wire-disconnection diagnostic means described in the 30$^{th}$ embodiment of the invention performs diagnosis of wire disconnection in one of the excitation coils in the pair when the output level of the detection coil has exceeded the predetermined reference level. Thereby, a wire disconnection location in the inlet sensor or the like can be identified.

In an IC card reader according to the 34$^{th}$ embodiment of the invention, the wire-disconnection diagnostic means described in the 30$^{th}$ embodiment of the invention performs diagnosis of wire disconnection or the like by exciting the excitation coils after information read/write is performed on the IC card and the IC card is ejected. Thereby, wire disconnection in the inlet sensor can be detected in advance until the genuineness or obverse and reverse sides of a subsequent IC card is detected.

Further, in an IC card reader according to the 35$^{th}$ embodiment of the invention, the wire-disconnection diagnostic means described in the 30$^{th}$ embodiment of the invention performs diagnosis of wire disconnection or the like in the sensor by exciting the excitation coils before the inlet sensor detects the contact terminal portion of the IC card after the IC card is inserted into an inlet of the card transport path. Thereby, wire disconnection or the like in the inlet sensor can be detected in advance before the inlet sensor senses the genuineness or the obverse and reverse sides of the IC card.

Further, in an IC card reader according to the 36$^{th}$ embodiment of the invention, the inlet sensor described in the 30$^{th}$ embodiment of the invention outputs a low standby signal front the detection coil when having excited the exciting coils. As such, the voltage value of the standby signal is compared whereby to enable detecting wire disconnection of the detection coil. Consequently, resilience or the like in the inlet sensor can be detected.

BRIEF DESCRIPTION OF THE DRAWINGS

FIG. 4 shows a schematic layout example in the case where the object sensor of the present invention is used as a coin presence/absence detection sensor, in which FIG. 4(a) is an explanatory side view and FIG. 4(b) is an explanatory plan view.

FIG. 8 depicts example three-dimensional core bodies, in which FIG. 8(a) is an explanatory appearance perspective view of a cylinder-like core body and FIG. 8(b) is an explanatory appearance perspective view of a square-column-like core body.

DETAILED DESCRIPTION OF THE INVENTION

First, embodiments of an object sensor according to the present invention will be described in detail with reference to the drawings.

Figure 1:
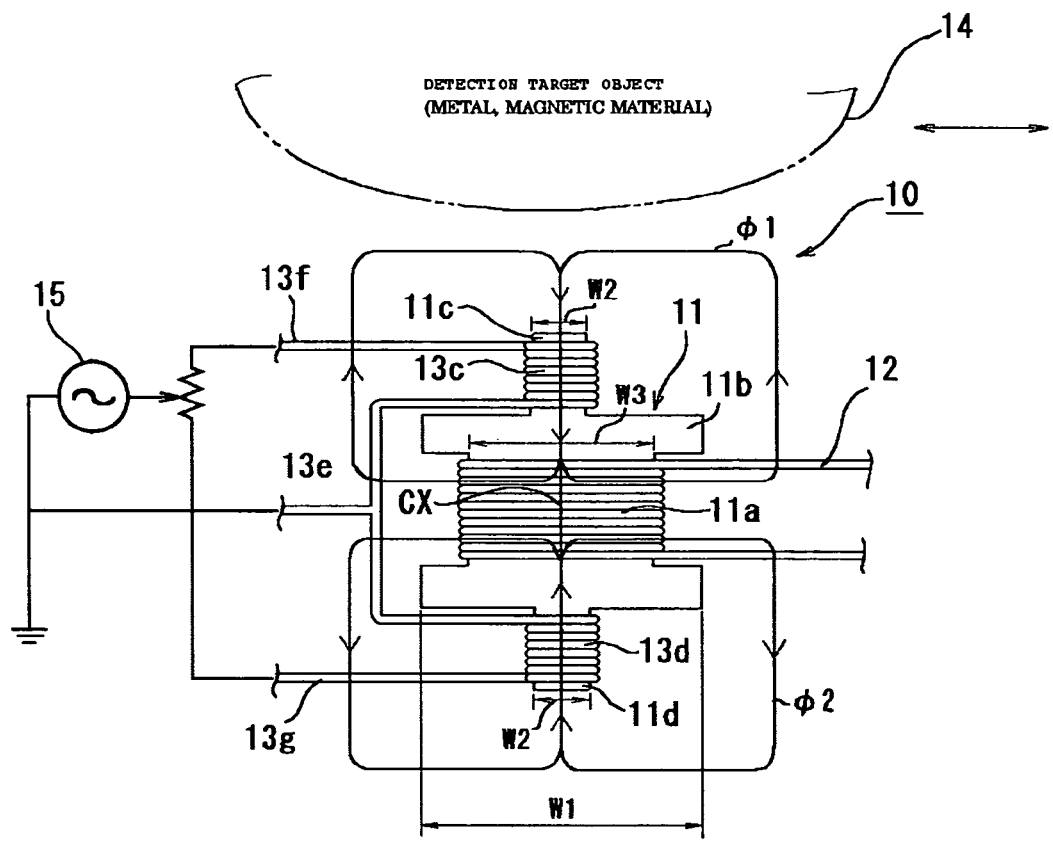
FIG. 1 is an explanatory side view showing an outline of the structure an object sensor according to an embodiment of the present invention.
Figure 2:
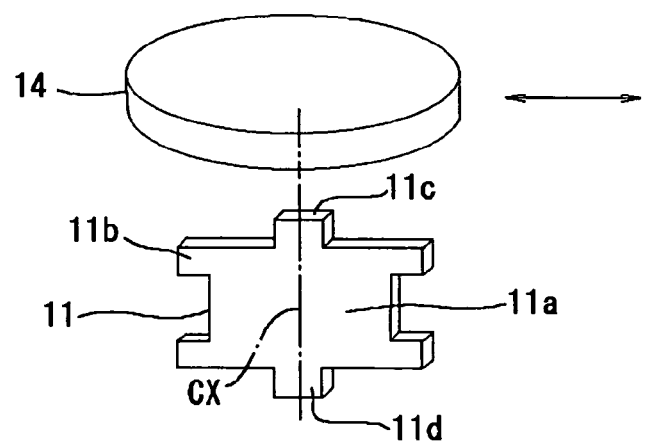
FIG. 2 is an appearance perspective view showing a configuration of a core body of the object sensor shown in FIG. 1.

With reference to FIGS. 1 and 2, in an object sensor 10 according to one embodiment, a detecting coil 12 is wound around a central core portion 11a of a core body 11 formed of a single thin-plate shaped member. In addition, excitation coils 13c and 13d are respectively wound around individual axial-end core portions 11c and 11d in a pair integrally connected individually via engagement flange portions 11b on both sides of the central core portion 11a in the vertical direction as viewed in the drawing.

Of the axial-end core sections 11c and 11d in the pair, the axial-end core section 11c on the one side is disposed on the upper side as viewed in the drawing to face a detection target object 14 formed from a metal member or a magnetic material. In the present embodiment, the direction of an axial center CX (vertical direction as viewed in the drawing) extending to the axial-end core section 11d on the other side through the central core portion 11a is set to a positional relationship substantially perpendicular to the movement direction of the detection target object 14. The detection target object 14 is reciprocated to the axial-end core section 11c on the one side along the direction substantially perpendicular to the axial center CX, whereby the axial-end core section 11c on the one side and the detection target object 14 are positioned close to each other and away in opposition to each other. Thereby, when both the members 11c and 14 are positioned opposite each other within an appropriate distance range, the existence (presence) of the detection target object 14 is detected. In the configuration, the object sensor 10 moves in the state where the detection-target object 14 is fixed.

More specifically, the central core portion 11a is disposed in a substantially center portion of the object sensor 10 in an extending direction of the axial center CX (vertical direction as viewed in the drawing). In addition, a width dimension W1 in the direction (left-right direction as viewed in the drawing) perpendicular to the direction of the axial center CX is set to be relatively wide. However, the axial-end core sections 11c and 11d are each set to a width dimension W2 smaller than the width dimension W1 of the central core portion 11a (W2<W1). More specifically, the core sections are each formed to have a half or smaller dimension (W2≦W1/2) in the present embodiment. In this case, the portion on which the detecting coil 12 is wound in the central core portion 11a is formed into a shape with a cutout to have a slightly narrow width dimension W3.

The excitation coils 13c and 13d in the pair, which are respectively wound on the two axial-end core sections 11c and 11d, are formed of a series of coil members integrally connected. Inner end portions individually having coil windings in the axial-end core sections 11c and 11d of the individual coil members are integrally interconnected a crossover 13e in a series connected state. Lead portions 13f and 13g led out of end sides of the respective axial-end core sections 11c and 11d are individually connected to both terminal portions of an AC power supply 15. A sine wave and rectangular wave generated from the AC power supply 15 are applied to individual coil winding portions of both the axial-end core sections 11c and 11d. Thereby, opposed magnetic fields φ1 and φ2, which are in the directions opposite each other, are formed on the same axial center CX.

In this case, the individual engagement flange portions 11b and 11b provided between the central core portion 11a and the axial-end core sections 11c and 11d in the pair are each in a bulged state protruding in the width direction substantially perpendicular to the direction of the axial center CX. The excitation coil 13c,13d and the testing coil 12 are individually wound in front and rear positions in the axial direction with respect to the individual engagement flange portions 11b. Thus, the winding positions of the excitation coils 12 and 13c,13d are positioned by the respective engagement flange portions 11b and 11b.

In the object sensor 10 in the present embodiment having the above-described configuration, a detection output obtainable from the detecting coil 12 is in accordance with a magnetic field equivalent to the sum of the reverse-directional opposed magnetic fields φ1 and φ2 in the directions opposite each other, which are generated by the excitation coils 13c and 13d in the pair. Accordingly, in the event that either the detection target object 14 does not exist (is absent) or the detection target object 14 is present in a portion at a sufficiently long distance (infinitely long distance) from the object sensor 10, absolute values of the reverse-directional opposed magnetic fields φ1 and φ2 become the same (|φ1|=|φ2|), so that the output from the detecting coil 12 becomes "0". On the other hand, when the object sensor 10 and the detection target object 14 are relatively close to each other whereby entering a state where the detection target object 14 exists (present), eddy currents occurring in the detection target object 14 vary corresponding to variations of the distance between the two. Thereby, the balance between the reverse-directional opposed magnetic fields φ1 and φ2 is lost, whereby when, for example, φ1 increases, φ2 decreases. Then, a differential output can be obtained from the detecting coil 12 in accordance with a magnetic field equivalent to the difference of absolute values (|φ1|−|φ2|) of opposed magnetic fields φ1 and φ2 at the above event.

While one output can be obtained in accordance with the differential state, the output is expressed by the following equation, for example.

$$\text{Output} = d\phi_1/dt - d\phi_2/dt$$

Where,
$\phi_1 = A \sin \omega t$
(Same phase)
$\phi_2 = B \sin \omega t$

That is, according to the object sensor 10 having the above-described configuration, the excitation coils 13c and 13d and the detecting coil 12 are separately disposed. In addition, the detection is performed in accordance with the balance between the excitation coils 13c and 13d in the pair, so that while the thin and small core body 11 are being used, a magnetic flux variation amount can be obtained at high sensitivity with linearity, regardless of the impedance due to a DC resistance part and the like. Additionally, notwithstanding environmental temperature variations, a steady detection operation for the presence or absence of the detection target object 14 can be implemented without using a conventional constant-current power reduction circuit but by using a cheap circuit.

Further, according to the present embodiment, the axial-end core sections 11c and 11d disposed opposite the detection target object 14 are each sized to have a narrow width, whereby the electric current efficiency is improved. An increased number of magnetic fluxes are thereby generated, so that the detection variation amount, i.e., the detection sensitivity, for the presence or absence of the detection target object 14 can be even more improved.

Further, according to the object sensor 10 in the present embodiment, the engagement flange portions 11b are individually provided in border portions between the central core portion 11a and the axial-end core sections 11c and 11d thereby to enable accurate positioning of the winding positions of the individual coils 12, 13c, and 13d. Consequently, phase differences or output differences are reduced, and a high variation rate can be obtained.

Further, according to the object sensor 10 in the present embodiment, since the output balance between the excitation coils 13c and 13d in the pair are made the differential state, the detection can be implemented that is even higher in sensitivity and accuracy. Further, with the differential arrangement, the temperature characteristics are excellent.

Figure 3:
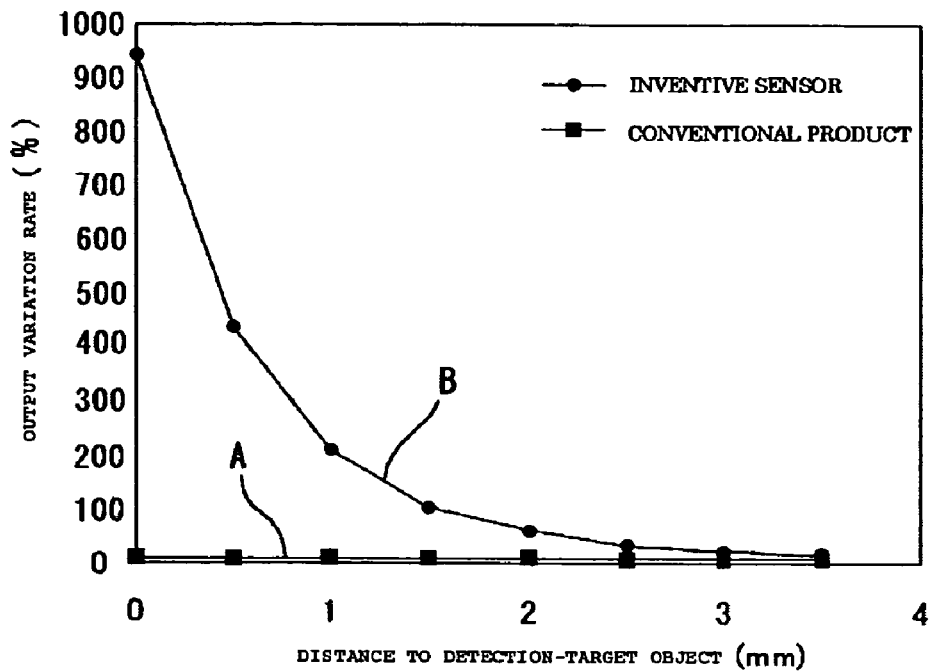
FIG. 3 is a diagram showing a comparison between detection outputs of an object sensor of the present invention and a conventional sensor.

The object sensor 10 according to the present invention and a conventional product were compared under the following conditions. Excitation coils with coil-winding turns 20T were used for the excitation coils 13c and 13d, a detecting coil with coil-winding turns 40T was used for the detecting coil 12, and the excitation frequency was set to 1 MHz, and the exciting current was set to 20 mApp (0.65 V). The results as shown in FIG. 3 were obtained. With the conventional object sensor (line A in FIG. 3), there could be obtained a variation amount of only about 10-20% with respect to the output variation rate (vertical axis of FIG. 3; %) to the distance (horizontal axis of FIG. 3; mm) between the detection target object 14 and the object sensor 10, wherein the variation rate shows the value when "1" is assumed for the output from the detecting coil 12 when the detection target object 14 is absent or present in a portion at a sufficiently long distance (infinitely long distance). In comparison, however, with the object sensor 10 (line B in the same figure) according to the present invention, a significant variation amount of 900-950% could be obtained.

Figure 4:
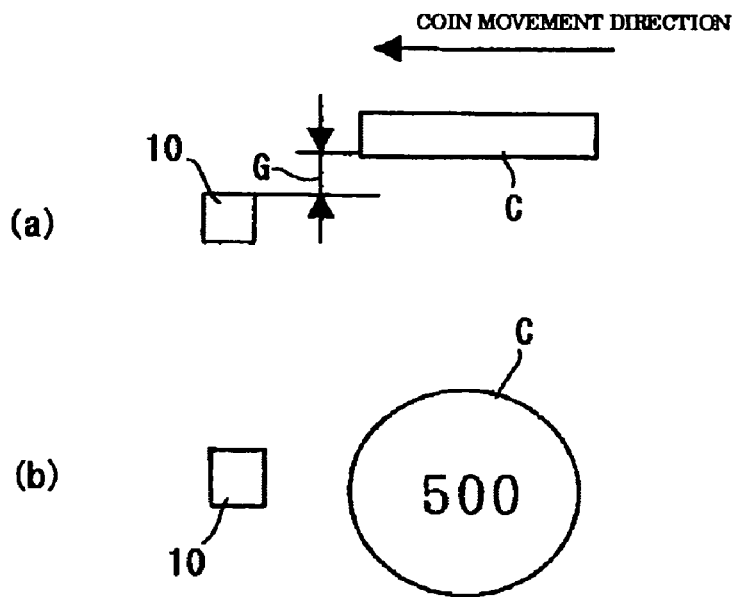
Figure 5:
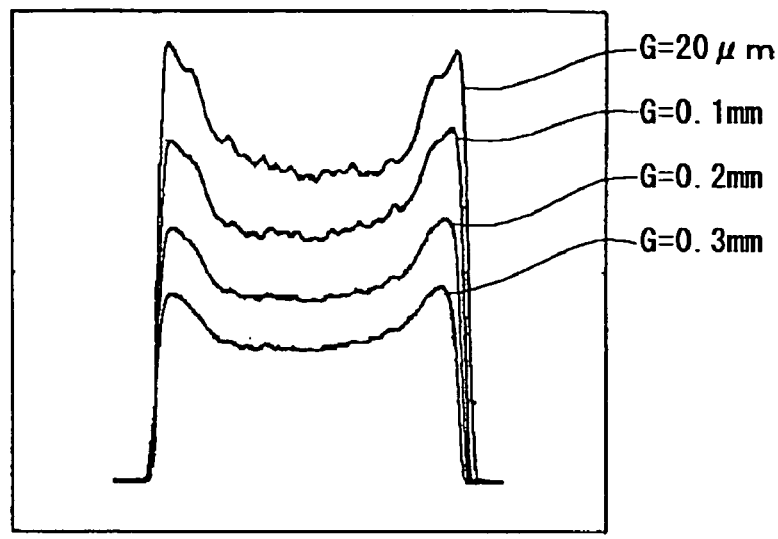
FIG. 5 is a diagram showing an example output obtained in the configuration shown in FIG. 4.

In addition, as shown in FIGS. 4(a) and 4(b), the object sensor 10 according to the present invention was actually used as a coin sensor that senses the presence or absence of a coin C, such as a "500-Yen" coin. As a consequence, excellent measurement results as shown in FIG. 5 could be obtained notwithstanding a distance G (gap) between the coin C and the object sensor 10. The results shown in FIG. 5 were those of measurements performed with electric currents and amplifier gains being set to fixed states.

Figure 6:
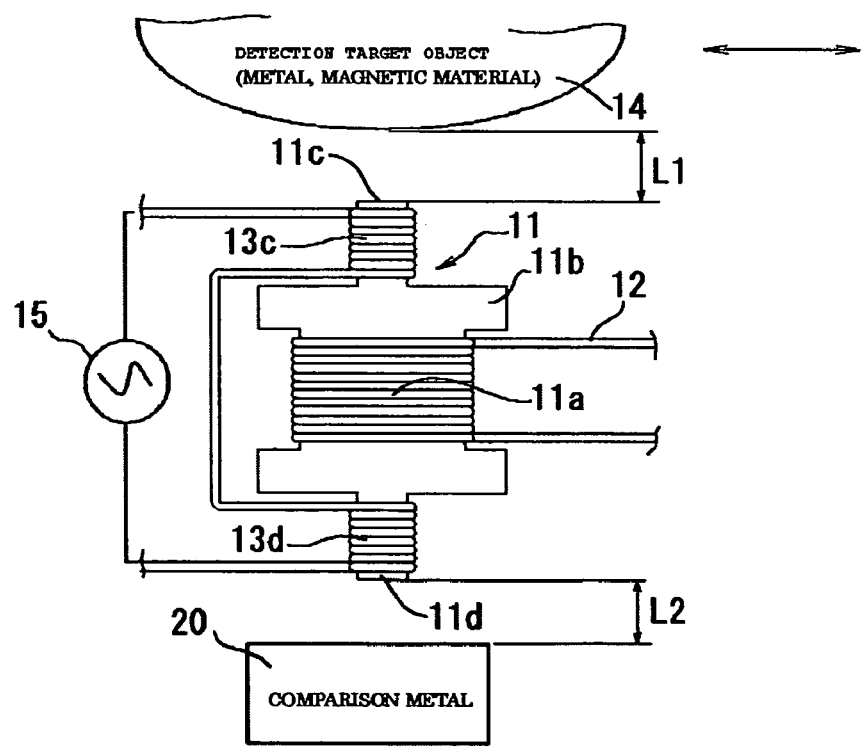
FIG. 6 is an explanatory side view showing a schematic configuration of an object sensor according to another embodiment of the present invention.
Figure 7:
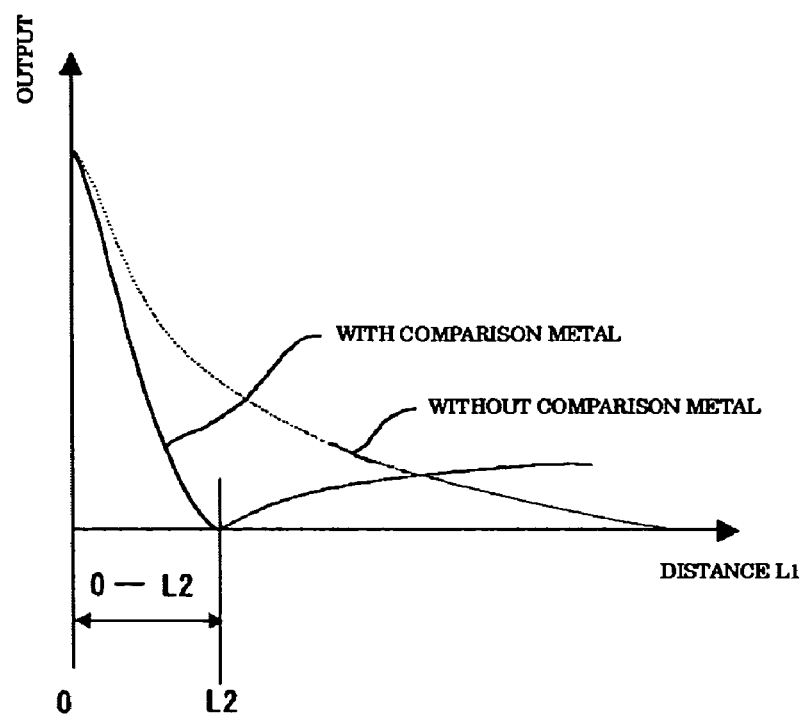
FIG. 7 is a diagram showing an adjusted state of a detection range of the object sensor shown in FIG. 6.

The following will describe an embodiment with reference to FIG. 6, in which the same components as the above-described embodiment are shown with the same reference characters. Of axial-end core sections 11c and 11d in a pair, the axial-end core section 11c on the one side is disposed on the upper side as viewed in the drawing to face the detection target object 14. Concurrently, the axial-end core section 11d on the other side is disposed on the lower side as viewed in the drawing to face a comparison metal body 20 of the same material as the detection target object 14 or of a material that has an electric conductivity at a level equivalent to that of the detection target object 14 (e.g., it is a non-magnetic material in the case that the detection target object 14 is a non-magnetic material) or that has a magnetic permeability at a level equivalent to that of the detection target object 14 (e.g., it is a magnetic material in the case that the detection target object 14 is a magnetic material). For example, it is assumed that the detection target object 14 is of an aluminium material, copper, ferrite, permalloy, or the like. In this case, the comparison metal body 20 is formed using the same one of the aluminium material, copper, ferrite, and permalloy, or a combination of magnetic materials selected therefrom, or a combination of non-magnetic materials selected therefrom.

The configuration is arranged such that when the detection target object 14 is moved in the left-right direction, as viewed in the drawing, to face and leave away from the object sensor 10, the axial-end core section 11c on the one side is brought to face and leave away from the detection target object 14, whereby a distance L1 between these two members is variable between a finite value and an infinite value. In this event, the axial-end core section 11d is maintained at a predetermined position without changing a distance L2 with respect to the comparison metal body 20.

Accordingly, the output from the detecting coil 12 becomes "0" at a position at which the distance L2 between the comparison metal body 20 and the axial-end core section 11d on the other side becomes equal to the distance L1 between the axial-end core section 11c on the one side and the detection target object 14. As such, a high detection output can be obtained to sense the presence or absence of the detection target object 14 when the axial-end core section 11c on the one side and the distance L1 in which the detection target object 14 is detected is set to the range of a distance identical to or less than the distance L2 between the comparison metal body 20 and the axial-end core section 11d on the other side ($0 \leq L1 \leq L2$).

As described above, according to the object sensor of the present embodiment, the differential between the detection output from the detection target object 14 and the detection output detection output from the comparison metal body 20 is used as a variation amount. Accordingly, in a detection range necessary for the detection target object 14 which the range is shown by reference characters 0 to L2, the position L2 at which the output becomes "0" can be used by being arbitrarily changed by changing the distance L2 between the comparison metal body 20 and the axial-end core section 11c, the material of the comparison metal body 20, and the like. Consequently, the detection accuracy can be enhanced by obtaining a high output for the presence or absence of the detection target object 14.

While the above has thus described in detail the embodiment regarding the object sensor of the present invention proposed by the present inventor, the present invention is limited by the embodiment, but various modifications may of course be made without departing the spirit and scope of the invention.

For example, according to the embodiment of the object sensor, the excitation coils 13c and 13d are disposed on two sides with the detecting coil 12 being interposed in the central portion. However, detecting coils may be disposed on two sides with an excitation coil being interposed in the central portion.

According to the embodiment of the object sensor, although the width dimension of the axial-end core section 11c is smaller than the width dimension of the central core portion 11a (W2<W1), the width dimensions of the two may be set equal to each other or to the opposite dimensional relationship, for example. Further, in the central core portion 11a of the core body 11 in the embodiment, the portion on which the detecting coil 12 is wound is provided with a recessed cutout portion. However, the portion may be formed into a simple rectangular form without provision of the cutout portion.

Figure 8:
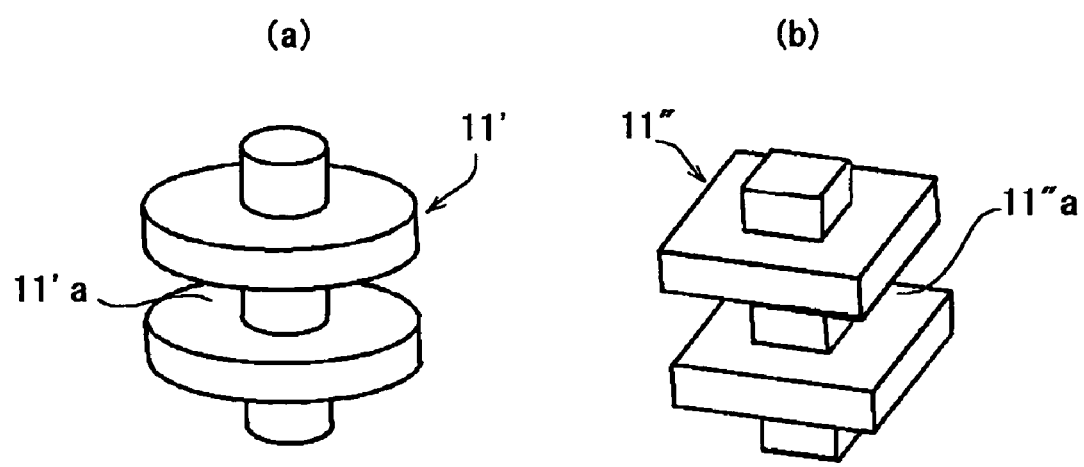

Further, according to the embodiment of the object sensor, although the single thin-plate shaped member is used for the core body, three-dimensional core bodies 11' and 11" shown in FIGS. 8(a) and 8(b) may be used in a manner similar to the above. Also in this case, the core body may be formed into a simple form without forming a cutout-like recessed portion 11'a, 11" provided in the axially central portion.

Figure 9:
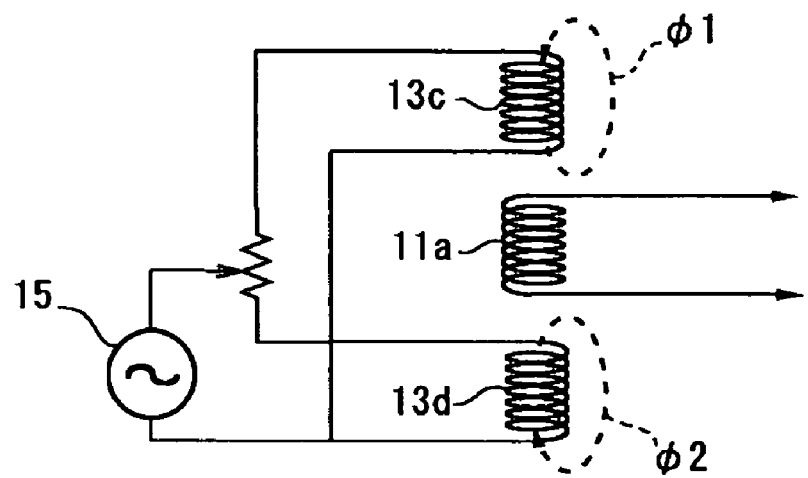
FIG. 9 is an explanatory circuit diagram showing example parallel connection of excitation coils.
Figure 10:
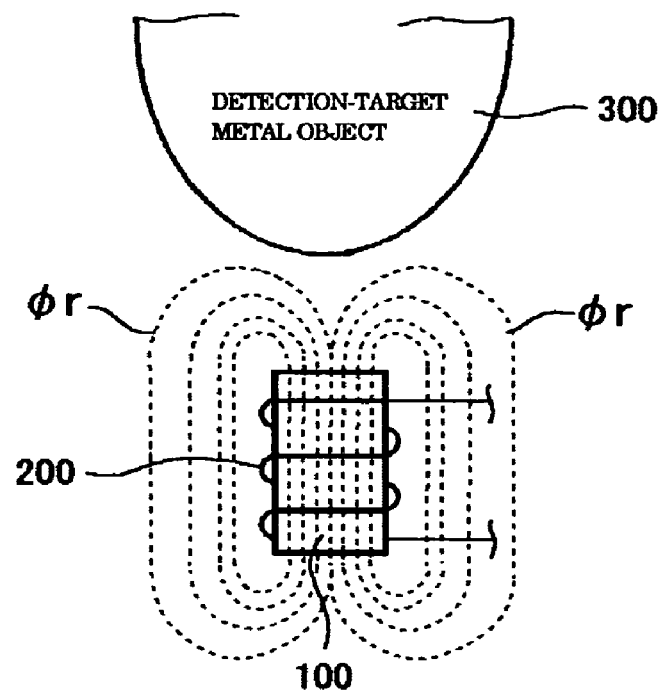
FIG. 10 is an explanatory side view showing a schematic configuration of a general object sensor.
Figure 11:
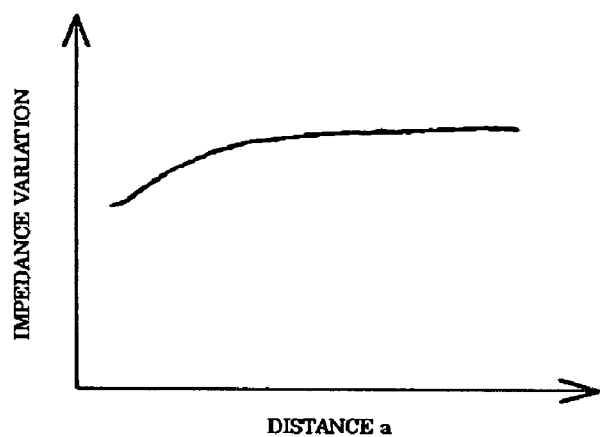
FIG. 11 is a diagram showing a detection output of the general object sensor shown in FIG. 10.
Figure 12:
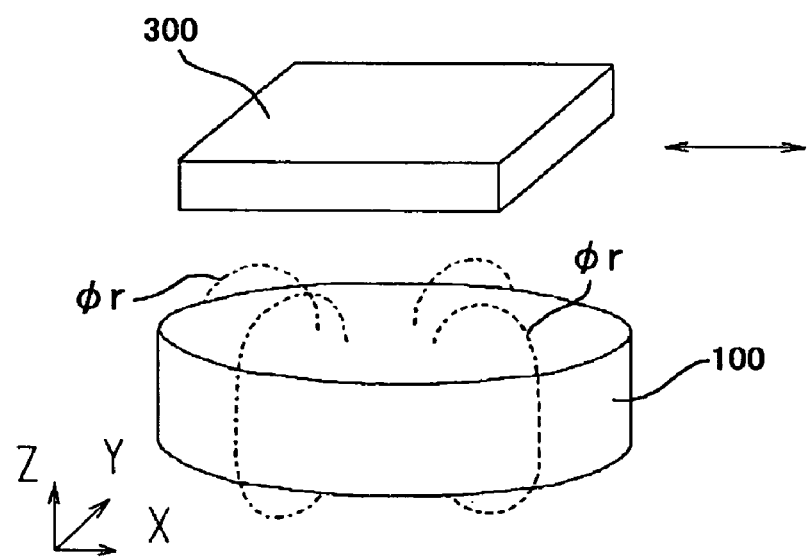
FIG. 12 is an explanatory appearance perspective view showing a schematic configuration of a general object sensor.

Further, according to the embodiment of the object sensor, the excitation coils 13c and 13d in the pair are serially and integrally connected in a serial state. However, as is shown in FIG. 9, the excitation coils 13c and 13d may be connected in a parallel state to the AC power supply 15 whereby to enable forming opposed magnetic fields.

Further, according to the embodiment of the object sensor, the single excitation power supply is provided alone. However, separate power supplies may be disposed for the individual excitation coils 13c and 13d. In this case, however, the power supplies should be set so that the phases thereof are synchronized.

A case can be contemplated in which the width dimensions W2 and W2 of the axial-end core sections 11c and 11d in the pair in the embodiment of the object sensor are made slightly different by, for example, 5 μm because of manufacturing error, and consequently, the differential output when no detection target object is present does not become "0". In this case, the electric current value to be supplied to the excitation coils 13c and 13d may be offset-adjusted thereby to cause the differential output to "0", whereby the problem can easily be addressed.

The following will now describe in detail embodiments of IC card readers each having the above-described object sensor with reference to the drawings.

Figure 31:
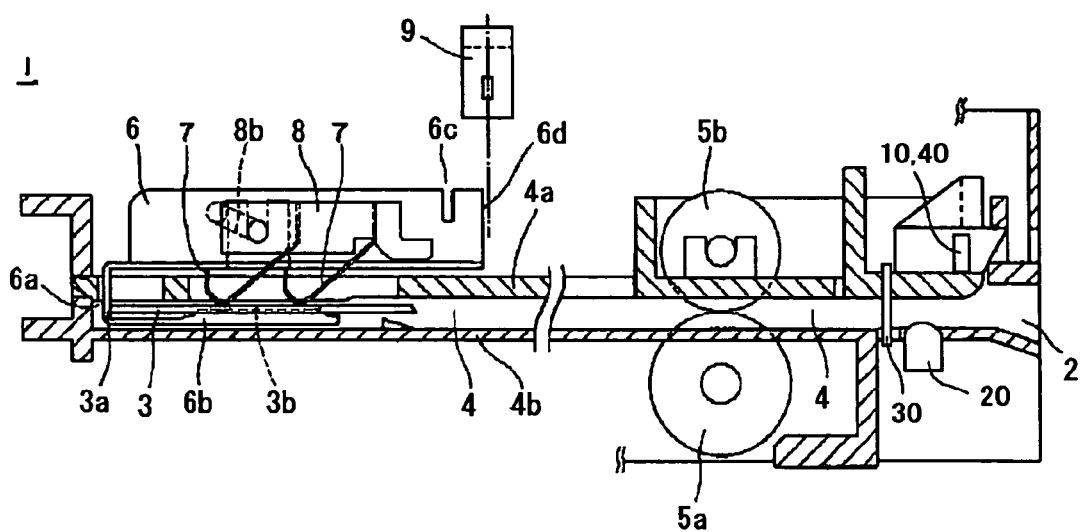
FIG. 31 is an explanatory vertical sectional view showing a state where an IC card has been transported to a read/write position in a card transport path of an IC card reader having an object sensor (inlet sensor) according to an embodiment of the present invention.

FIGS. 13, 14, 31, 32, 42, and 43 show the IC card readers in a mode in which an IC card 3 is inserted and information is read/written. An "IC card 3" in an embodiment shown in FIG. 31 is assumed to be a "contact IC card 3". In addition, the "object sensor" is assumed to be an "inlet sensor" or "magnetic differential sensor".

As shown, the configuration is formed such that in an apparatus mainbody of the IC card reader, an IC card 3 inserted through an card insertion slot 2 provided on the right side as viewed in the drawing is guided by a card transport path 4 situated to extend along the substantially horizontal direction to be fed to an apparatus rear end side. The card transport path 4 is configured in the form sandwiched between an upper frame 4a and a lower frame 4b. A card feed roller 5a or feed pad 5b provided as transport drive means disposed in a relatively forward position (right side as viewed in the drawing) of the card transport path 4 is rotationally driven by a motor (not shown). Thereby, the IC card 3 is led to a card read/write position disposed on the rear end side (right end side as viewed in the drawing).

Figure 42:
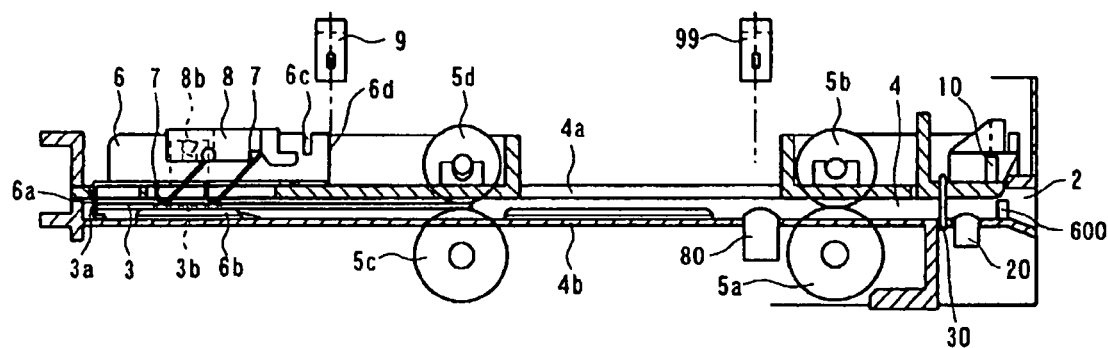
FIG. 42 is an explanatory vertical sectional view showing a state where an IC card has been transported to a read/write position in a card transport path of an IC card reader having an object sensor (inlet sensor) according to an embodiment of the present invention.
Figure 43:
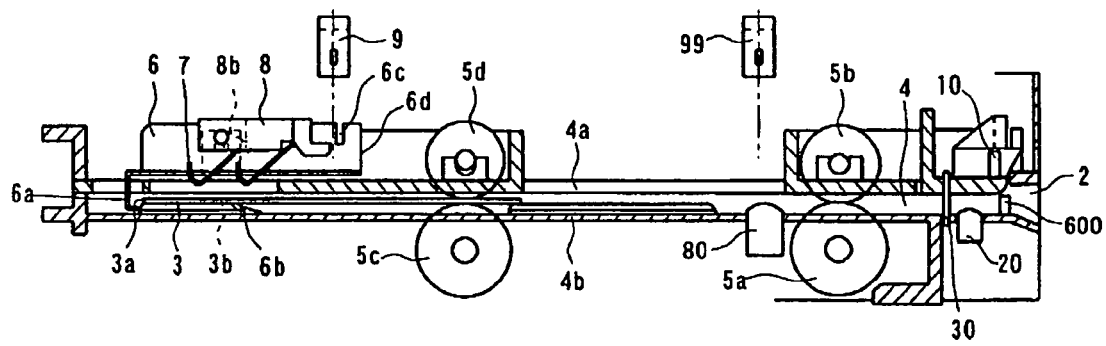
FIG. 43 is an explanatory vertical sectional view showing a state immediately before the IC card arrives at the read/write position in the card transport path of the IC card reader shown in FIG. 41.
Figure 44:
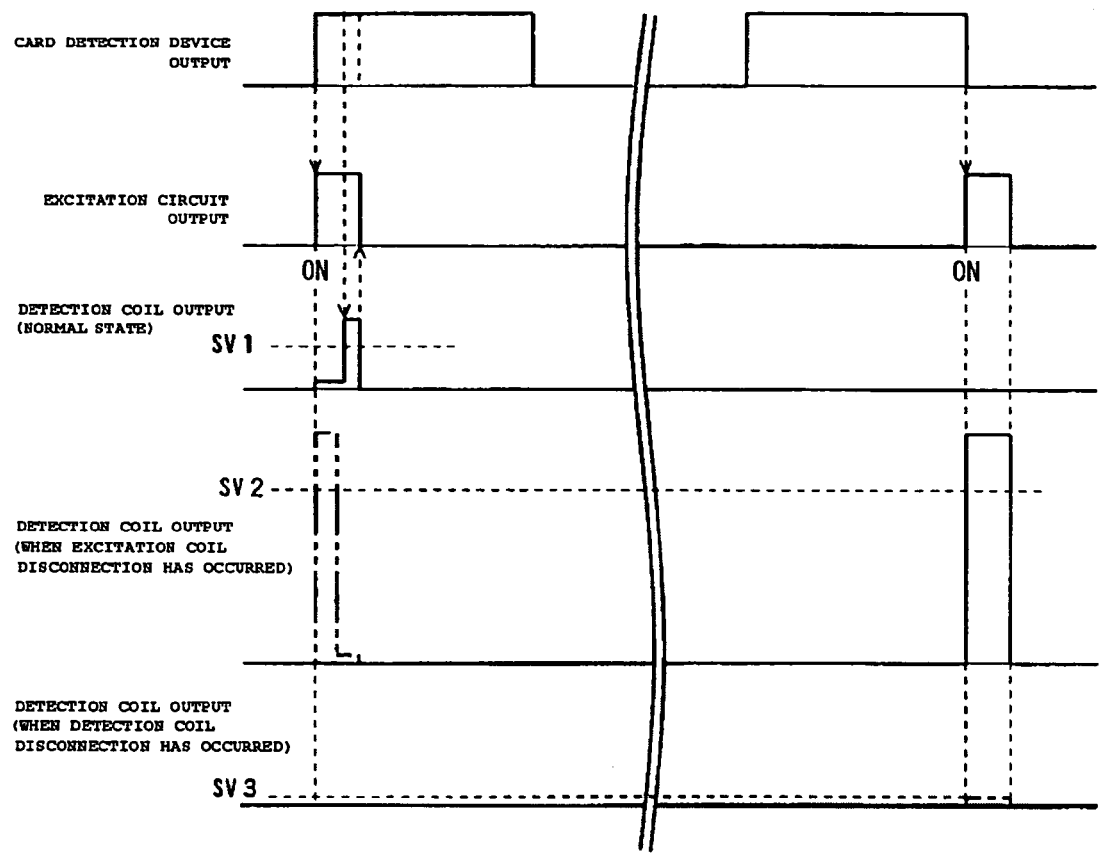
FIG. 44 is a waveform diagram showing signals in individual states of the control circuit section shown in FIG. 41.

In an IC card reader shown in FIGS. 42 and 43, a card feed roller 5c and a card feed pad 5d are disposed in a substantially central position of the card transport path 4. The card feed rollers 5a and 5c or feed pads 5b and 5d are rotationally driven by a motor (not shown). Thereby, the IC card 3 is led to the card read/write position disposed on the rear end side (right end side as viewed in the drawing).

More specifically, the IC card 3 fed from the card insertion slot 2 into the inside of the card transport path 4 is further pushed after a leading edge 3a of the IC card 3 is abutted against a card abutment member 6, and the card abutment member 6 and the IC card 3 are moved along a card travel direction. In line with the movement of the card abutment member 6, an IC contact 7 is moved to a position where it is abutted against a contact terminal portion 3b of the IC card 3 by action of a contact block 8.

The card abutment member 6 has a projection portion 6a on which the leading edge 3a of the IC card 3 is abutted, and a receiving means 6b for receiving and supporting the reverse side of the IC card 3. The projection portion 6a is formed to face downward in an end portion of the card abutment member 6 (left end side as viewed in the drawing). The projection portion 6a is disposed such that a portion thereof projects into the card transport path 4, which is formed of the upper frame 4a and the lower frame 4b, to allow the abutment of the IC card 3 traveling in the card transport path 4.

Figure 32:
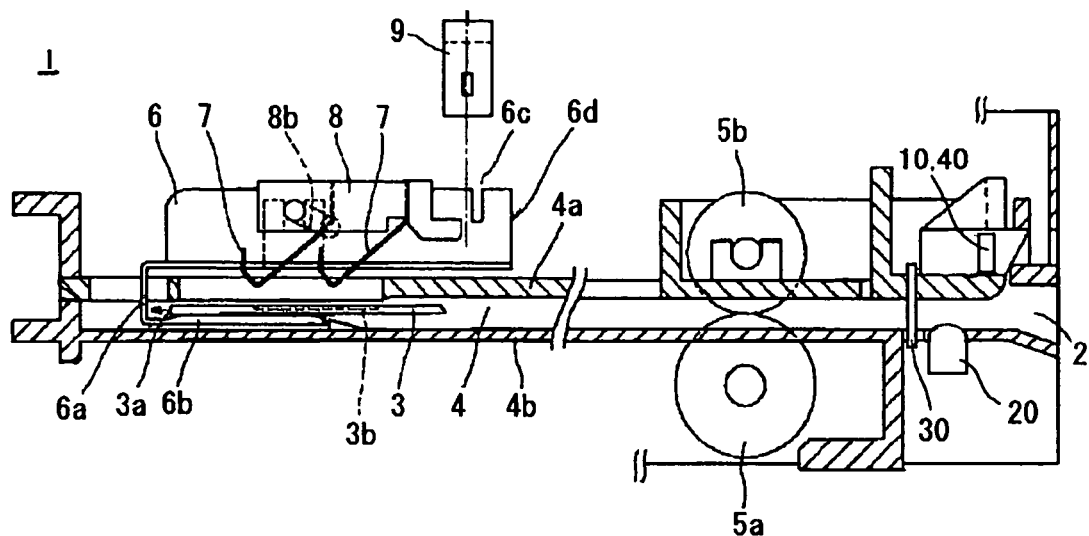
FIG. 32 is an explanatory vertical sectional view showing a state immediately before the IC card arrives at the read/write position in the card transport path of the IC card reader shown in FIG. 31.

The card abutment member 6 is thus provided movably in the direction along which the IC card 3 travels. The card abutment member is returnably urged by, for example, a spring (not shown) in the direction of the tail edge of the IC card 3, that is, the card entry side in the right direction as viewed in the drawing, and is held into a standby state in a rearward position (rightward position as viewed in the drawing), as shown in FIGS. 32 and 43, until the IC card 3 is moved by being abutted to the card abutment member 6. Then, the IC card 3 travels toward the card read/write position on the leftward side as viewed in the drawing, and the leading edge 3a of the IC card 3 abuts the projection portion 6a of the card abutment member 6. Then, the card abutment member 6 and the IC card 3 moves to the card travel direction, that is, to a deeper side in the left direction, whereby the card abutment member 6 arrives at a card set position shown in FIGS. 13, 31, and 42, that is, the position where information read/write is performed on the IC card 3.

The contact block 8 engages the card abutment member 6 while retaining the IC contact 7 formed in the shape of a probe needle. In connection with the movement of the card abutment member 6 to the end side left direction as viewed in the drawing, the contact block 8 descends along a cam groove 8b in an oblique direction from a card leaving position shown in FIGS. 14, 32, and 43, and arrives in a card abutment position shown in FIGS. 13, 31, and 42. The contact block 8 is configured to cause the IC contact. 7 to abut the contact terminal portion 3b of the IC card 3 immediately before arriving at the card abutment position.

A sensor 9 is disposed on an upper side as viewed in the drawing to detect a slit 6c, which is provided in the card abutment member 6, and a rear-end-side end face 6d of the card abutment member. By detection of the slit 6c by the sensor 9, timing to reduce the travel speed of the IC card 3 is detected; and by detection of the rear-end-side end face 6d by the sensor 9, it is detected that the IC card 3 is stopped at the card read/write position. In the present embodiment, an optical sensor is used for the sensor 9, but different means such as a magnetic sensor and a mechanical sensor may instead be used.

Other particular features are that, as shown in FIGS. 14, 32, and 43, and FIGS. 15, 33, and 16, the magnetic differential inlet sensor 10 for detecting the contact terminal portion 3b of the IC card 3 to thereby detect the card validity (whether the card is valid) is provided to face the inside of the card transport path 4. This sensor is provided in the insertion direction of the IC card 3 (left direction as viewed in the drawing) on a more upstream side than the card read/write position, more specifically, in a position immediately after the card insertion slot 2 on the left direction as viewed in the drawing. On the downstream side of the inlet sensor 10 in the insertion direction of the IC card 3, a magnetic pre-head 20 constituting the inlet sensor that is used in the case of using a card having a magnetic record information section and a shutter means 30 for opening or closing the card transport path 4 are provided in such a manner as being sequentially parallel.

In the IC card reader shown in FIGS. 42 and 43, a card detection device 600 for detecting the width the IC card 3 in the insertion direction to thereby sense the propriety of the card is provided on the upstream side of the sensor 10 in the insertion direction of the IC card 3.

The magnetic differential inlet sensor 10 has the function of detecting the contact terminal portion 3b of the IC card 3 inserted from the card insertion slot 2. Thereby, when inserted IC card 3 is found to be proper, the shutter means 30 is operated into an opened state in accordance with a detected signal indicative of the propriety. However, when the inserted card is found to be improper, that is, the contact terminal portion 3b of the IC card 3 is not detected, the shutter means 30 is maintained in a closed state whereby to enable preventing, for example, use of an illegal card.

Figure 33:
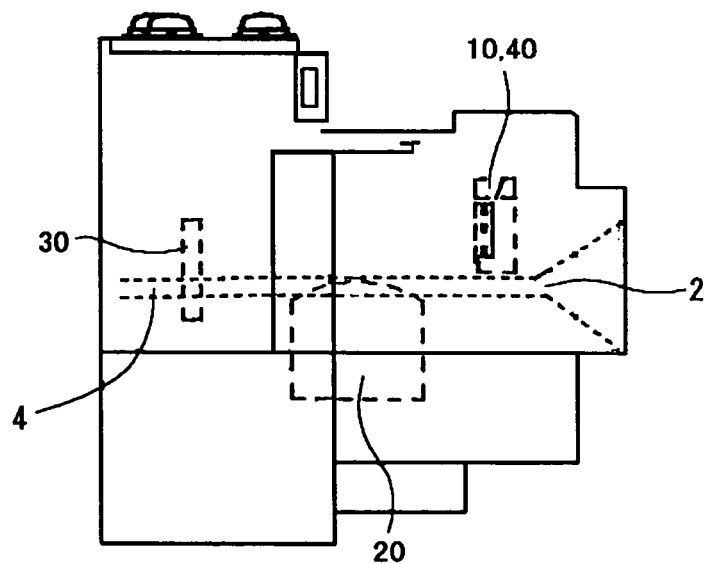
FIG. 33 is an enlarged explanatory side view showing a card insertion slot portion in the card transport path of the IC card reader shown in FIG. 31.
Figure 34:
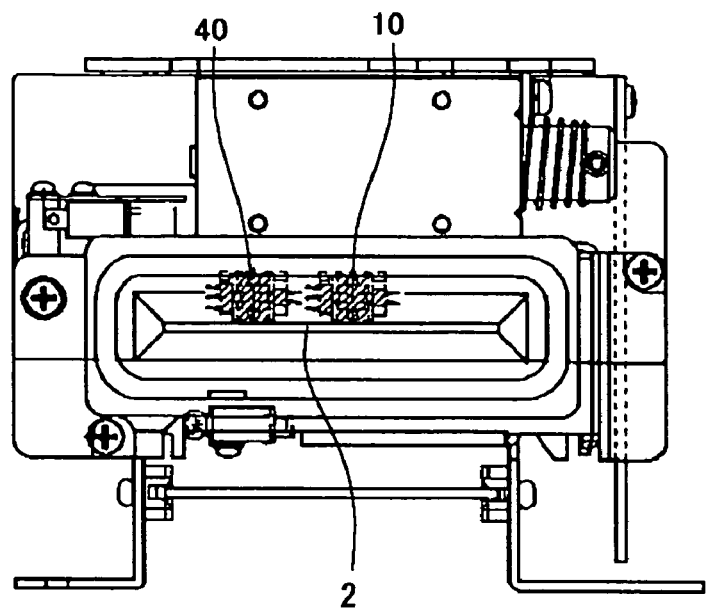
FIG. 34 is an explanatory front view of the card insertion slot portion shown in FIG. 33.
Figure 35:
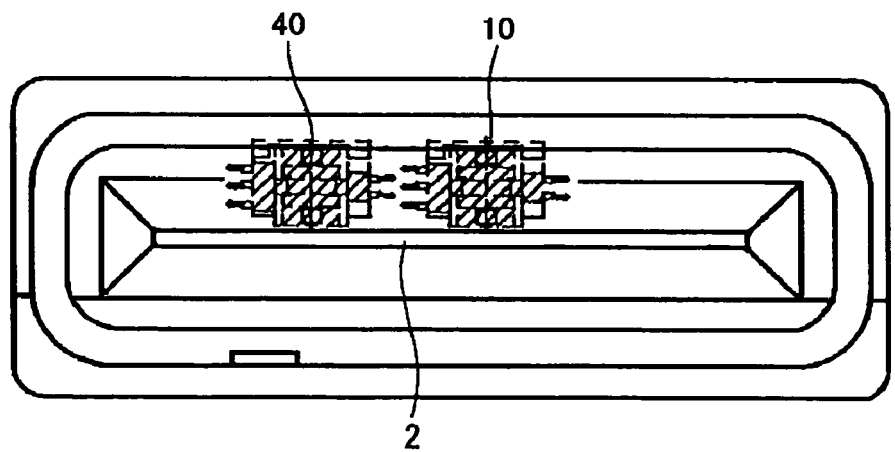
FIG. 35 is an enlarged explanatory front view showing the card insertion slot portion shown in FIG. 34.

As shown, particularly, in FIGS. 33, 34, and 35, three inlet sensors 20, 10, and 40 for detecting the type of an inserted card are provided on a more upstream side than the card read/write position in a card insertion portion, that is, the insertion direction (left direction as viewed in the drawing) of the contact IC card 3 card insertion slot 2. The inlet sensors 20, 10, and 40 are respectively formed of a first magnetic sensor 20 responsible for detecting the magnetic stripe of the card, a second magnetic sensor 10 responsible for detecting the contact terminal portion of the contact IC card, and a third magnetic sensor 40 responsible for detecting the antenna section of the contactless IC card.

Among the sensors, the second magnetic sensor 10 and the third magnetic sensor 40 are individually formed of magnetic differential sensors (inlet sensors) provided to face the inside the card transport path 4 (detail configuration will be described further below). In the present embodiment, the sensors are situated in parallel in the direction substantially perpendicular to the card travel direction immediately after the card insertion slot 2 on the left side as viewed in FIG. 1, whereby two sensors 10 and 40 are disposed in substantially the same as each other.

The second magnetic sensor 10 has the function of detecting the contact terminal portion 3b provided in the contact IC card 3. When a contact IC card 3 is inserted from the card insertion slot 2, a detected signal is output from the second magnetic sensor 10. The third magnetic sensor 40 is disposed to detect the antenna section disposed by being routed around in such a manner as to form a belt. When a contactless IC card is inserted from the card insertion slot 2, a detected signal is output from the third magnetic sensor 40.

The first magnetic sensor 20 constitutes the magnetic prehead that is used in the case of using a card having a magnetic stripe as being a magnetic record information section, and is situated slightly downstream (deep side) of the second and third magnetic sensors 10 and 40. When a card such as a magnetic card having a magnetic stripe is inserted from the card insertion slot 2, a detected signal is output from the first magnetic sensor 20.

In addition, a known shutter means for opening or closing the card transport path 4 is disposed on a downstream side of the first magnetic sensor 20 in the card transport direction (deep side). Thereby, when the inserted IC card 3 is found to be proper, the shutter means 30 is operated into an opened state in accordance with detected signal indicative of the propriety. However, when the inserted card is found to be improper, that is, the contact terminal portion 3b of the IC card 3 is not detected, the shutter means 30 is maintained in a closed state whereby to enable preventing, for example, use of an illegal card.

Figure 13:
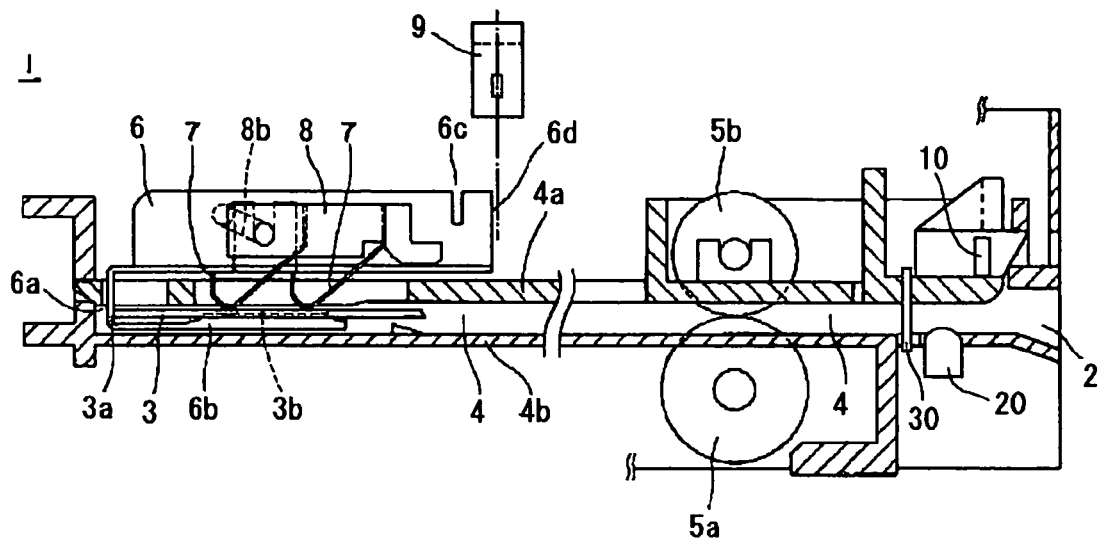
FIG. 13 is an explanatory vertical sectional view showing a state where an IC card has been transported to a read/write position in a card transport path of an IC card reader having an object sensor (inlet sensor) according to an embodiment of the present invention.
Figure 14:
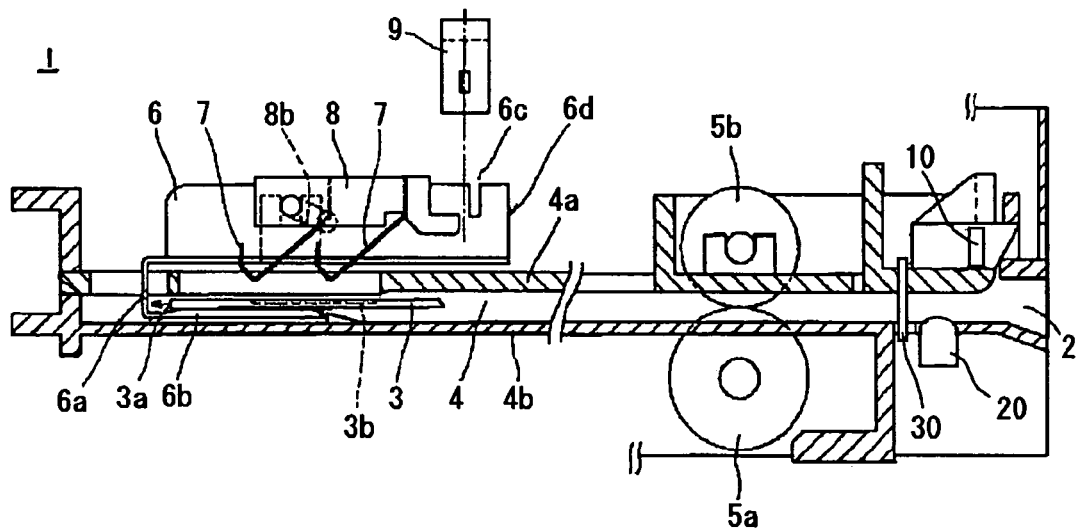
FIG. 14 is an explanatory vertical sectional view showing a state immediately before the IC card arrives at the read/write position in the card transport path of the IC card reader shown in FIG. 13.
Figure 15:
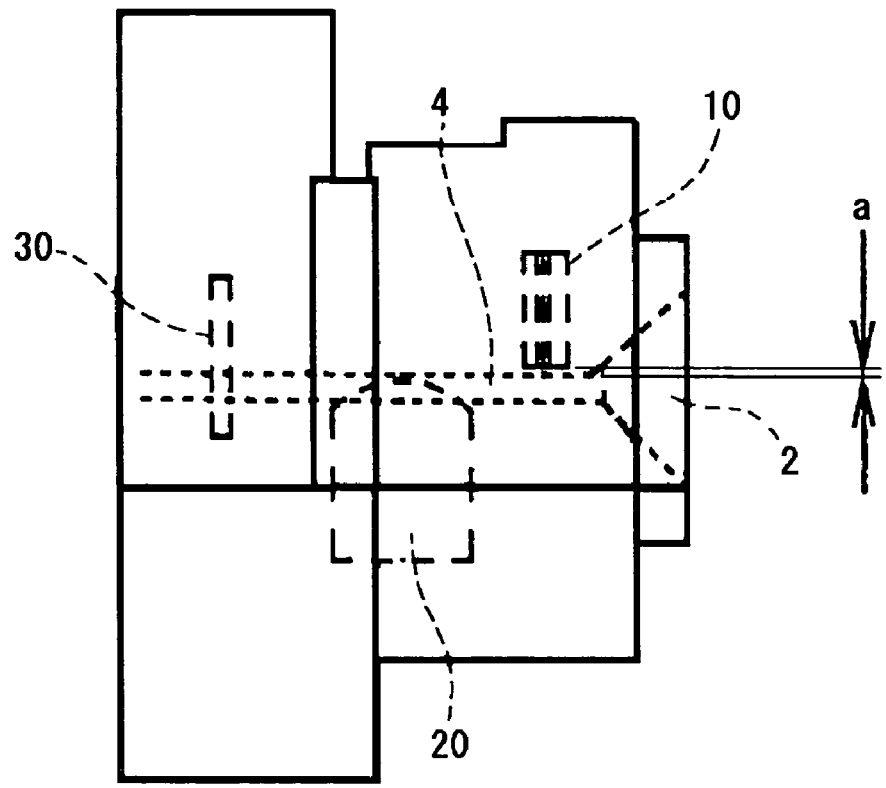
FIG. 15 is an explanatory side view showing the configuration of a card insertion slot portion in the card transport path of the IC card reader shown in FIG. 13.
Figure 16:
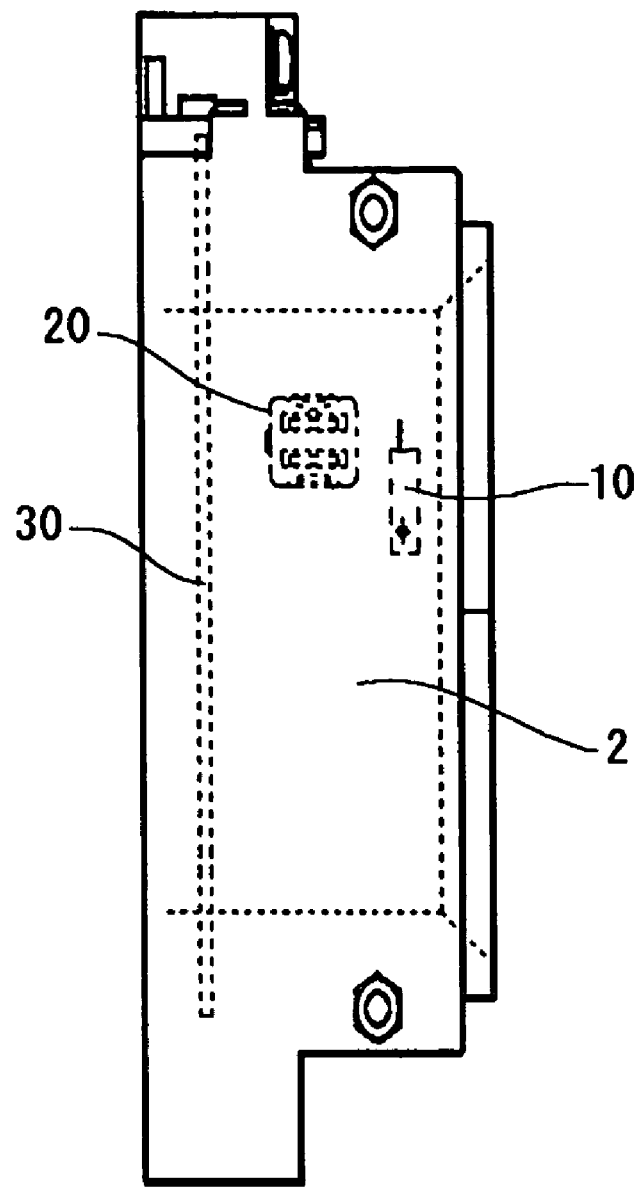
FIG. 16 is an explanatory plan view of the card insertion slot portion shown in FIG. 15.

In the IC card reader shown in each of, for example, FIGS. 13, 32, and 42, an opening/closing circuit of the shutter means 30 is similar to a conventionally known one, so that description thereof is omitted herefrom. The configuration may be such that the shutter means 30 of the aforementioned type be not provided, but motor drive control be performed so as not to feed an illegal card into the apparatus.

When a sense signal (sense signal indicative that the IC card 3 is proper) from the proper IC card 3 has been output from the second magnetic sensor 10 (inlet sensors 20, 10, and 40 in the embodiment shown in FIG. 31), the card and the motor of the transport driving means are driven in accordance with the detected signal. Thereby, the card feed roller 5a (card feed rollers 5a and 5c in the embodiment shown in FIG. 42) is rotationally driven, and the IC card 3 is transported into the card transport path 4 by being passed through the shutter means 30. The leading edge 3a of the IC card 3 travelling inside the card transport path 4 is guided to the projection portion 6a of the card abutment member 6. Even after the leading edge 3a of the IC card 3 has abutted the projection portion 6a, the card feed roller 5a (card feed rollers 5a and 5c in the embodiment shown in FIG. 42) is continually rotationally driven whereby to cause the IC card 3 to travel. Consequently, the projection portion 6a of the card abutment member 6 is pushed by the leading edge 3a of the IC card 3 to the card travel direction, whereby the card abutment member 6 together with the IC card 3 are moved deeper in the card travel direction, that is, on the left direction as viewed in the drawing.

In the configuration, the contact block 8 engaging the card abutment member 6 vertically moves in line with the movement of the card abutment member 6 in the card travel direction. More specifically, the contact block 8 descends by using the cam groove 8b thereby to bring the IC contact 7 into contact with the contact terminal portion 3b. Even after that operation, the IC card 3 moves to the position where information read/write is performed, so that the contact block 8 further descends in association therewith. Consequently, as the IC card 3 approaches the card read/write position, the IC contact 7 is further pushed against the contact terminal portion 3b of the IC card 3.

In the embodiment shown in FIG. 31, the second magnetic sensor 10 and the third magnetic sensor 40 are formed of the magnetic differential sensors having the configurations substantially the same as each other. An example structure of the magnetic differential sensor will be described in detail hereunder. As described above, since the two sensors 10 and 40 have the configurations same as each other, only the second magnetic sensor 10 will be described.

According to the embodiment shown in FIGS. 42 and 43, the IC card reader is configured to enable information read/write on an inserted magnetic card (not shown) in which a magnetic record information section formed of a magnetic stripe on one side. That is, a magnetic pre-head 20 constituting an inlet sensor for the magnetic card is disposed downstream of the second magnetic sensor 10 in the insertion direction of the card. Thereby, when the magnetic card is inserted from the card insertion slot 2, the magnetic pre-head 20 first senses the magnetic record information section of the magnetic card. Thereby, when the inserted magnetic card is found to be proper, the shutter means 30 is operated into an opened state in accordance with detected signal indicative of the propriety. However, when the inserted card is found to be improper, that is, the magnetic record information section of the magnetic card is not detected, the shutter means 30 is maintained in a closed state whereby to enable preventing, for example, use of an illegal card.

When a sense signal of the proper magnetic card has been output from the magnetic pre-head 20, the motor of the transport driving means is driven in accordance with the sense signal. Thereby, the card feed rollers 5a and 5c are rotationally driven, and the magnetic card is transported into the card transport path 4 by being passed through the shutter means 30.

On a downstream side of the card feed roller 5a, a magnetic head 80 for performing read/write of information in the magnetic record information section of the magnetic card is provided to face the inside of the card transport path 4. The magnetic card transported by the card feed roller 5a is transported while being brought into slide contact therewith. After, information read/write has been performed, the leading edge of the magnetic card arrives at the card feed roller 5c, and the magnetic card is further transported. Thereafter, the tail edge of the magnetic card leaves the card feed roller 5a and arrives at the magnetic head 80, whereupon the tail edge of the magnetic card is detected by a sensor 99. After the tail edge of the magnetic card has been detected by the sensor 99, rotational driving of the card feed rollers 5a and 5c is stopped to stop the transport of the magnetic card, and termination of the card read/write on the magnetic card is concurrently detected.

After the termination of the card read/write operation, the rotational driving direction of the card feed rollers 5a and 5c is reversed, whereby the magnetic card in the card transport path 4 is transported in the reverse direction and led to the card insertion slot 2. The tail edge of the magnetic card is brought to protrude from the card insertion slot 2, whereby the card is brought into a withdrawable state.

The configuration of the inlet sensor 10 will now be described in detail below.

Figure 36:
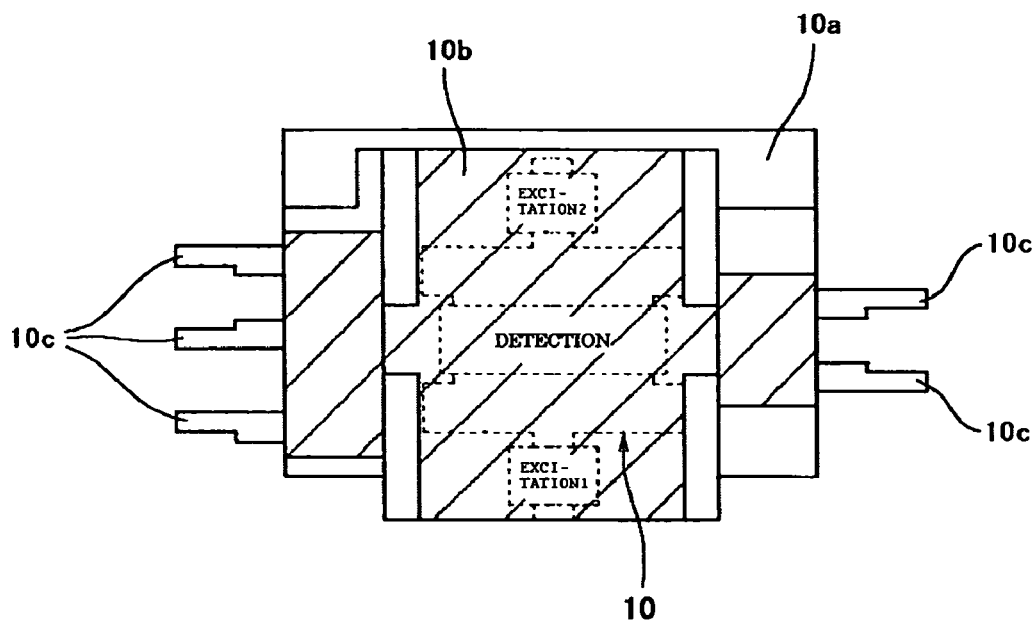
FIG. 36 is an explanatory side view showing an example magnetic differential sensor used in the IC card reader shown in FIG. 31.
Figure 37:
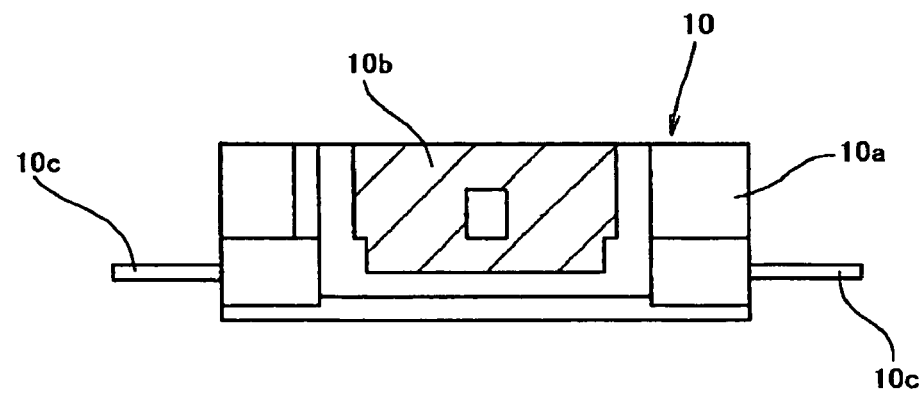
FIG. 37 is an explanatory plan view of the magnetic differential sensor (inlet sensor) shown in FIG. 36.

The inlet sensor in the embodiment shown, particularly, in each of FIGS. 13 and 42 is mounted in a housing 10a, as shown in FIGS. 36 and 37. Individual terminal plates 10*b* provided in such a manner as to extend substantially horizontally from the housing 10*a* are connected to a circuit controller section (not shown).

Similarly, the second magnetic sensor 10 in the embodiment shown in each of FIGS. 36 and 37 is formed of the magnetic differential sensor. The sensor is buried in a resin body 10*b* mounted to the housing 10*a*. Individual terminal plates 10*c* extend from the magnetic differential sensor (which hereafter referred to as "magnetic differential sensor 10") constituting the second magnetic sensor 10, and protrude substantially horizontally to the outside of the housing 10*a*. These terminal plates thus forms are connected to the circuit controller section (not shown).

Figure 20:
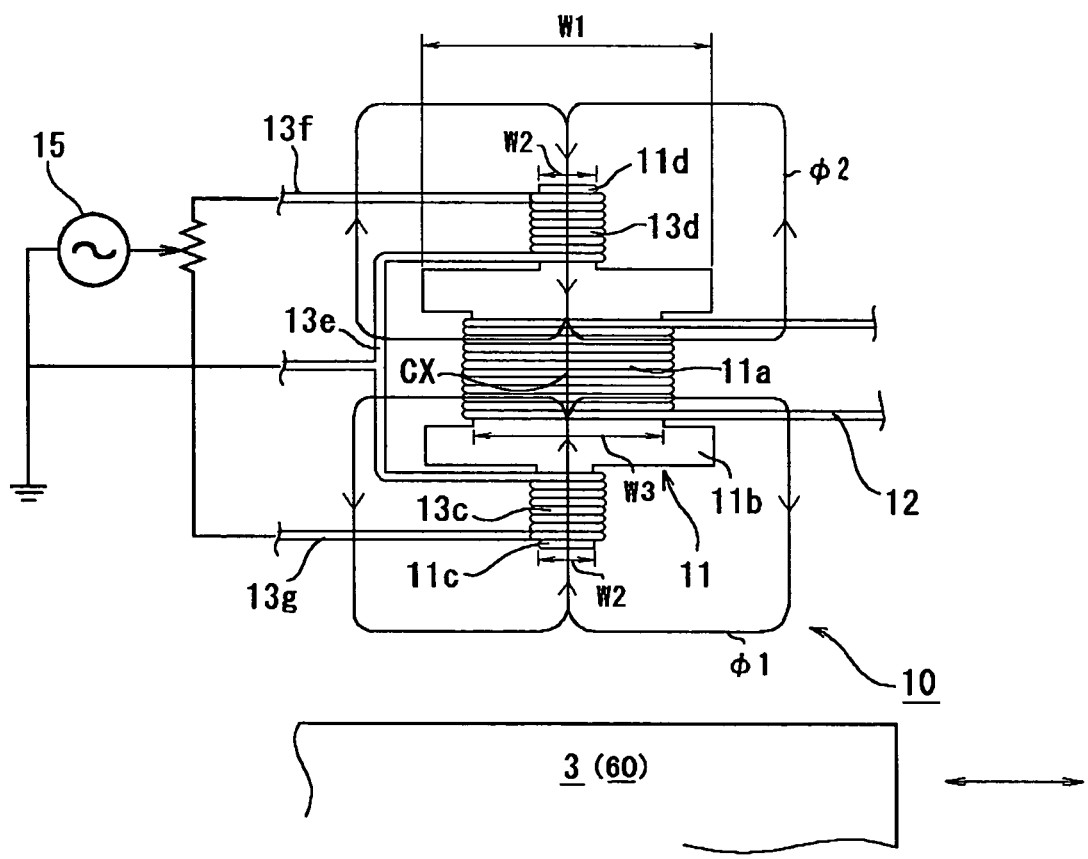
FIG. 20 is an explanatory side view showing a schematic configuration of the inlet sensor shown in FIG. 18.
Figure 21:
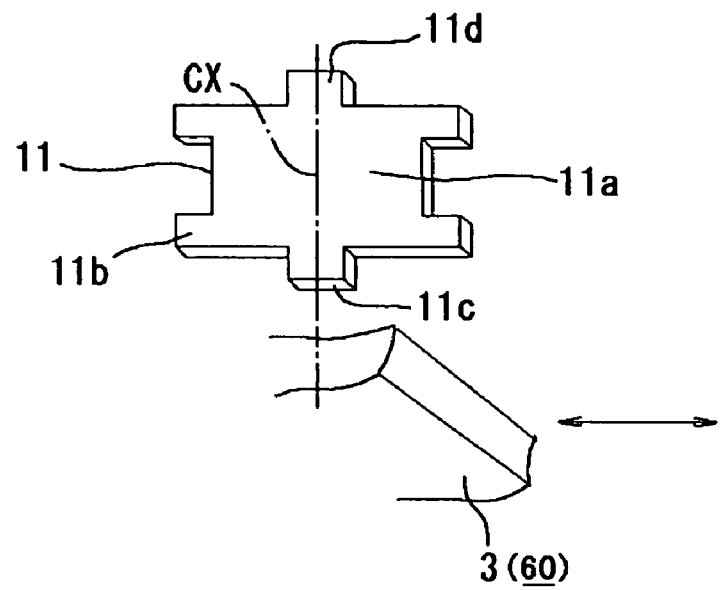
FIG. 21 is an explanatory appearance perspective view showing a core body structure of the inlet sensor shown in FIG. 20.

As is shown in FIG. 20, the inlet sensor (magnetic differential sensor) 10 itself has a magnetic differential configuration in which a detecting coil 12 is wound on a central core portion 11*a* of a core assembly 11 formed of a single thin-plate shaped member. In two sides in the vertical direction of a central core portion 11*a* as viewed in the drawing, excitation coils 13*c* and 13*d* are wound on axial-end core sections 11*c* and 11*d* in a pair, respectively.

of the axial-end core sections 11*c* and 11*d* in the pair, the axial-end core section 11*c* on the one side disposed on the upper side as viewed in the drawing is disposed to be faceable with the contact terminal portion 3*b* of the IC card 3 (the contact terminal portion 3*b* of the IC card 3 or the antenna section of the contactless IC card in the embodiment shown in FIG. 31). In the present embodiment, the direction of the axial center CX (vertical direction as viewed in the drawing) extending to the axial-end core section 11*d* on the other side through the central core portion 11*a* is set to a positional relationship substantially perpendicular to the contact terminal portion 3*b* of the IC card 3 (the contact terminal portion 3*b* of the IC card 3 or the antenna section of the contactless IC card in the embodiment shown in FIG. 31),. The contact terminal portion 3*b* of the IC card 3 (the contact terminal portion 3*b* of the IC card 3 or the antenna section of the contactless IC card in the embodiment shown in FIG. 31) is reciprocated to the axial-end core section 11*c* on the one side along the direction substantially perpendicular to the axial center CX, whereby the axial-end core section 11*c* on the one side and the contact terminal portion 3*b* of the IC card 3 (the contact terminal portion 3*b* of the IC card 3 or the antenna section of the contactless IC card in the embodiment shown in FIG. 31) are positioned close to each other and away in opposition to each other. Thereby, when both the members 11*c* and 3*b* (both the members in the embodiment shown in FIG. 31) are positioned opposite each other within an appropriate distance range, the existence (presence) of the contact terminal portion 3*b* of the IC card 3 (the contact terminal portion 3*b* of the IC card 3 or the antenna section of the contactless IC card in the embodiment shown in FIG. 31) is detected. The configuration may be such that the inlet sensor (magnetic differential sensor) 10 side moves in the state where the contact terminal portion 3*b* of the (contact) IC card 3 (the contact terminal portion 3*b* of the IC card 3 or the antenna section of the contactless IC card in the embodiment shown in FIG. 31) is fixed.

More specifically, in the configuration, the central core portion 11*a* is disposed in a substantially center portion of the inlet sensor (magnetic differential sensor) 10 in an extending direction of the axial center CX (vertical direction as viewed in the drawing). In addition, a width dimension W1 in the direction (left-right direction as viewed in the drawing) perpendicular to the direction of the axial center CX is set to be relatively wide. However, the axial-end core sections 11*c* and 11*d* are each set to have a width dimension W2 smaller than the width dimension W1 of the central core portion 11*a* (W2<W1). More specifically, the core sections are each formed to have a half or smaller dimension (W2<W1/2) in the present embodiment. In this case, the portion on which the detecting coil 12 is wound in the central core portion 11*a* is formed into a shape cutout to have a slightly narrow width dimension W3.

The excitation coils 13*c* and 13*d* in the pair, which are respectively wound on the two axial-end core sections 11*c* and 11*d*, are formed of a series of coil members integrally connected. Inner end portions individually having coil windings in the axial-end core sections 11*c* and 11*d* of the individual coil members are integrally interconnected by a crossover 13*e* in a series connected state. Lead portions 13*f* and 13*g* led out of end sides of the respective axial-end core sections 11*c* and 11*d* are individually connected to both terminal portions of an AC power supply 15 via an appropriate resistor. A sine wave and rectangular wave generated from the AC power supply 15 are applied to individual coil winding portions of both the axial-end core sections 11*c* and 11*d*. Thereby, opposed magnetic fields $\phi 1$ and $\phi 2$, which are in the directions opposite each other, are formed on the same axial center CX.

In this case, the individual engagement flange portions 11*b* and 11*b* provided between the central core portion 11*a* and the axial-end core sections 11*c* and 11*d* in the pair are each in a bulged state protruding in the width direction substantially perpendicular to the direction of the axial center CX. The excitation coil 13*c* and the testing coil 13*d* are individually wound in front and rear positions in the axial direction with respect to the individual engagement flange portions 11*b*. Thus, the winding positions of the excitation coils 13*c* and 13*d* are positioned by the respective engagement flange portions 11*b* and 11*b*.

In the inlet sensor (magnetic differential sensor) 10 of the present embodiment having the above-described configuration, a detection output obtainable from the detecting coil 12 is in accordance with a magnetic field equivalent to the sum of the reverse-directional opposed magnetic fields $\phi 1$ and $\phi 2$ in the directions opposite each other, which are generated by the excitation coils 13*c* and 13*d* in the pair. Accordingly, in the event that either the detection target object 14 does not exist (is absent) or the contact terminal portion 3*b* of the IC card 3 (the card in the embodiment shown in FIG. 31) detection target object 14 is present in a portion at a sufficiently long distance (infinitely long distance) from the inlet sensor (magnetic differential sensor) 10, absolute values of the reverse-directional opposed magnetic fields $\phi 1$ and $\phi 2$ become the same ($|\phi 1|=|\phi 2|$), so that the output from the detecting coil 12 becomes "0". On the other hand, when the inlet sensor (magnetic differential sensor) 10 and the contact terminal portion 3*b* of the IC card 3 (the card in the embodiment shown in FIG. 31) are relatively close to each other whereby entering a state where the it exists (present), eddy currents occurring in the contact terminal portion 3*b* of the IC card 3 (the IC card 3 side in the embodiment shown in FIG. 31) vary corresponding to variations of the distance between the two. Thereby, the balance between the reverse-directional opposed magnetic fields $\phi 1$ and $\phi 2$ is lost, whereby when, for example, $\phi 1$ increases, $\phi 2$ decreases. Then, a differential output can be obtained from the detecting coil 12 in accordance with a magnetic field equivalent to the difference ($|\phi 1|-|\phi 2|$) of absolute values of opposed magnetic fields $\phi 1$ and $\phi 2$ at the above event.

While one output can be obtained in accordance with the differential state, the output is expressed by the following equation, for example.

$$\text{Output} = d\phi_1/dt - d\phi_2/dt$$

Where, $\phi_1 = A \sin \omega t$
(Same phase)
$\phi_2 = B \sin \omega t$

That is, according to the inlet sensor (magnetic differential sensor) 10 having the above-described configuration, the excitation coils 13c and 13d and the detecting coil 12 are separately disposed. In addition, the detection is performed in accordance with the balance between the excitation coils 13c and 13d in the pair, so that while the thin and small core body 11 is being used, a magnetic flux variation amount can be obtained at high sensitivity with linearity, regardless of the impedance due to a DC resistance part and the like. Additionally, notwithstanding environmental temperature variations, a steady detection operation for the presence or absence of the contact terminal portion 3b of the IC card 3 (card side in the embodiment shown in FIG. 31) can be implemented without using a conventional constant-current power reduction circuit but by using a cheap circuit.

Further, according to the present embodiment, the axial-end core sections 11c and 11d disposed opposite the detection target object 14 are each sized to have a narrow width, whereby the electric current efficiency is improved. An increased number of magnetic fluxes are thereby generated, so that the detection variation amount, i.e., the detection sensitivity, for the presence or absence of the contact terminal portion 3b of the IC card 3 (the IC card 3 side in the embodiment shown in FIG. 31) can be even more improved.

Further, according to the inlet sensor (magnetic differential sensor) 10 of the present embodiment, the engagement flange portions 11b are individually provided in border portions between the central core portion 11a and the axial-end core sections 11c and 11d thereby to enable accurate positioning of the winding positions of the individual coils 12, 13c, and 13d. Consequently, phase differences or output differences are reduced, and a high variation rate can be obtained.

Further, according to the inlet sensor (magnetic differential sensor) 10 of the present embodiment, since the output balance between the excitation coils 13c and 13d in the pair are made into the differential state, the detection can be implemented at an even higher sensitivity and accuracy. Further, with the differential arrangement, when the IC card is absent or in an infinitely remote portion, the variation amounts of $\phi 1$ and $\phi 2$ due to temperature variations are substantially equalized, so that the output remains at "0". Consequently, the temperature characteristics are excellent.

The above-described inlet sensor 10 according to the present invention was evaluated under the following conditions. Excitation coils with coil-winding turns 20T (number of coil-winding turns) were used for the excitation coils 13c and 13d, a detecting coil with coil-winding turns 40T (number of coil-winding turns) was used for the detecting coil 12, and the excitation frequency was set 1 MHz, and the exciting current was set to 20 mApp (0.65 V). The results as shown in FIG. 3 were obtained. As a result, there could be obtained a sensor capable of performing steady detection operation, notwithstanding environmental temperature variations, as described below.

Figure 22:
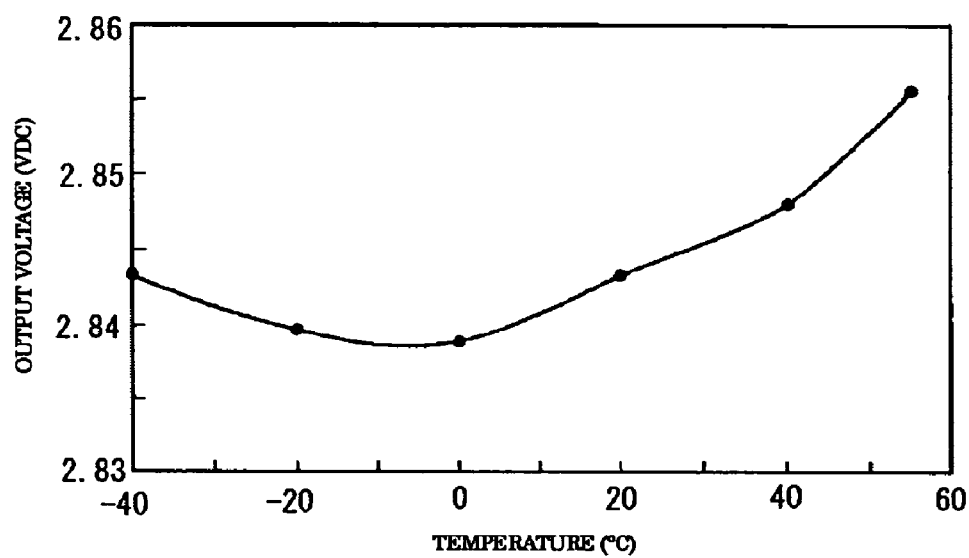
FIG. 22 is a diagram showing measurement results of temperature characteristics of the inlet sensor according to the present invention.

Actual measurement was performed at the output variations corresponding to the temperature variations of the magnetic differential inlet sensor 10 having the configuration described above. As is shown in FIG. 22 for example, the variations in the output voltage (vertical axis in FIG. 22) of the inlet sensor 10 was only 0.018 V or less with respect to the temperature variation (horizontal axis in FIG. 22) from −40° C. to +55° C. This is because the variation amounts of $\phi 1$ and $\phi 2$ are the same, as described above. A technique usable to detect the contact terminal portion 3b of the IC card 3 is to set a reference value (slice level) to be higher than the temperature variation of the output current from the inlet sensor 10 to perform the detection in order. In this case, since the temperature variation is very small in the output voltage from the inlet sensor 10, the inlet sensor 10 can be a high-sensitive sensor. In the present embodiment, the reference value (slice level) for the output voltage from the inlet sensor 10 is set to 10 times the above-described output variation (i.e., is set to 0.018 V).

The following views show the relationship between the output voltage from the inlet sensor 10 and the distance between the inlet sensor 10 and the contact terminal portion 3b of the IC card 3 when the reference value (slice level) is set as described above.

Figure 23:
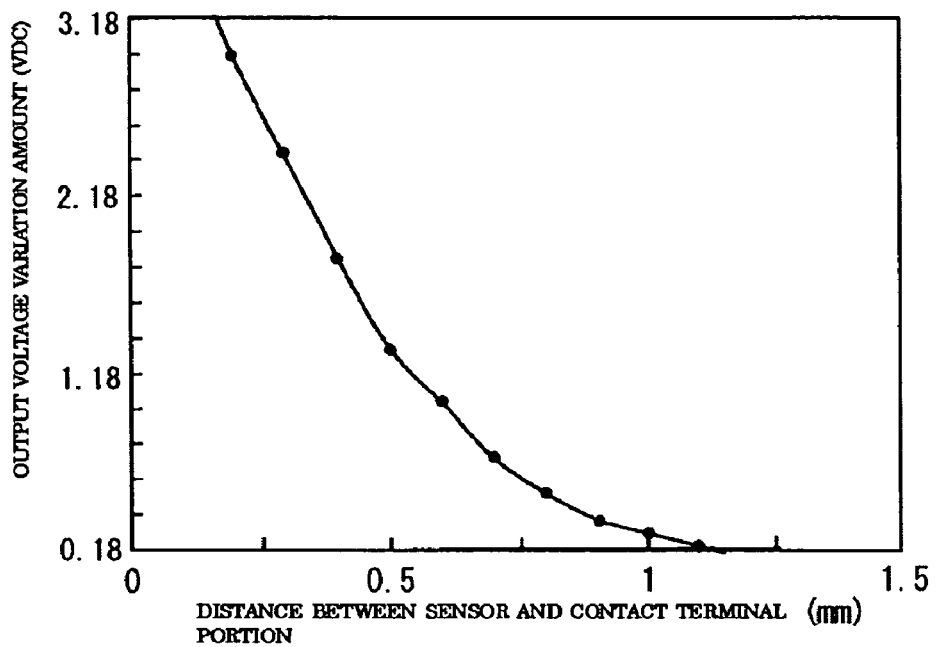
FIG. 23 is a diagram showing measurement results of relationships between distances between the inlet sensor and a contact terminal portion of the IC card and output voltages from the inlet sensor.

For example, as is shown in FIG. 23, the output voltage (vertical axis in FIG. 23) from the inlet sensor 10 is substantially proportional to the distance (horizontal axis in FIG. 3) between the inlet sensor 10 and the contact terminal portion 3b of the IC card 3. From this it is known that the distance between the inlet sensor 10 and the contact terminal portion 3b of the IC card 3 may be preferably set to, for example, "1.1 mm" or less in order to obtain a sense output exceeding the reference value (slice level: 0.18 V) actually set in the manner described above.

Figure 24:
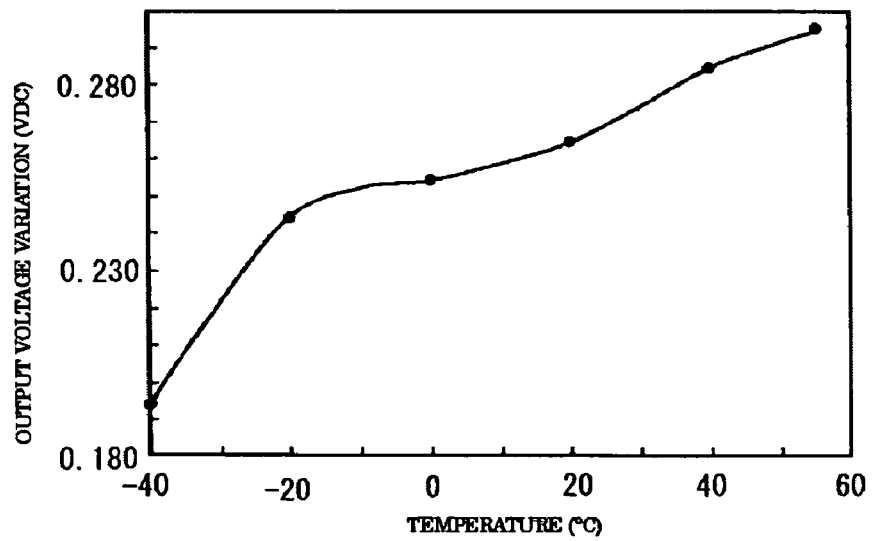
FIG. 24 is a diagram showing temperature characteristics of sensing output voltages obtained from an actually mounted inlet sensor.

Then, the inlet sensor 10 was mounted by setting the distance between the inlet sensor 10 and the contact terminal portion 3b of the IC card 3 to actually be "1 mm". As a result, as is shown in FIG. 24, for example, the output voltages (vertical axis in FIG. 24) of the inlet sensor 10 were obtained as sufficient outputs in all regions with excellent correlations with respect to the temperature variation (vertical axis in FIG. 24) between from −40° C. to +55° C.

From the above, when mounting the inlet sensor 10 in the present embodiment (magnetic differential sensors, namely, the second and third magnetic sensors 10 and 40, in the embodiment shown in FIG. 31), the inlet sensor 10 (second and third magnetic sensors 10 and 40 in the embodiment shown in FIG. 31) can be disposed in a position spaced away from the card transport path 4. Actually, the lower face as viewed in the drawing of the inlet sensor 10 (second and third magnetic sensors 10 and 40 in the embodiment shown in FIG. 31) is disposed in a position spaced away by an appropriate distance (for example, a ≈0.5 mm in the embodiment shown in FIG. 15) from the wall surface (lower face as viewed in the drawing) of the upper frame 4a of the card transport path 4. Thereby, the inlet sensor 10 (second and third magnetic sensors 10 and 40 in the embodiment shown in FIG. 31) is set not to contact the surface of the IC card 3. According to the configuration described above, the inlet sensor 10 (second and third magnetic sensors 10 and 40 in the embodiment shown in FIG. 31) is mounted to prevent potential deformation, damage, and the like from being caused by friction between, for example, the surface of the IC card 3 and dust entered into the apparatus.

Figure 38:
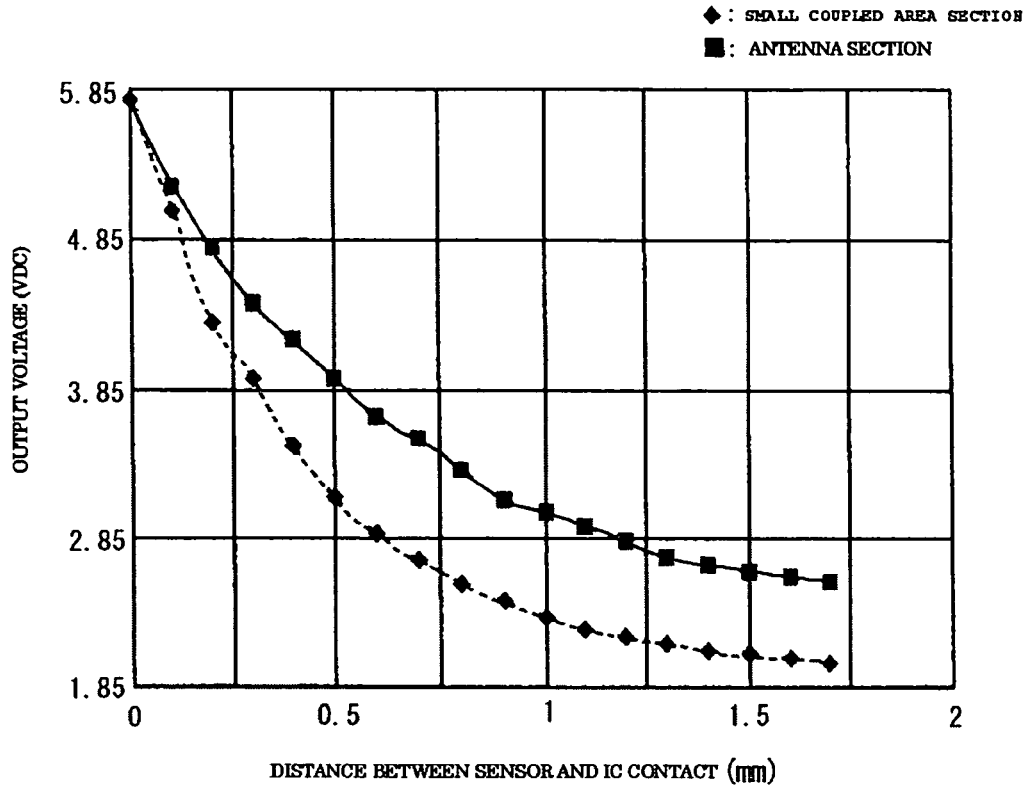
FIG. 38 is a diagram showing measurement results of relationships between distances between the magnetic differential sensor and the IC card and output voltages from the magnetic differential sensor.
Figure 39:
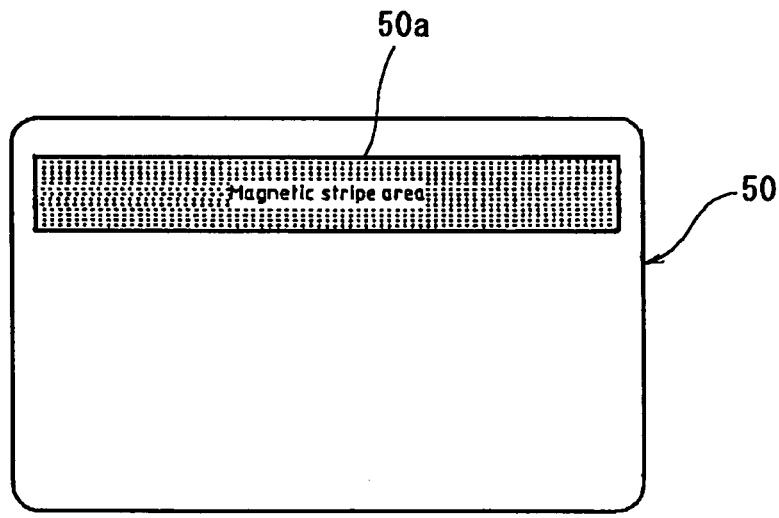
FIG. 39 is an explanatory plan view showing a position standard of a magnetic stripe in a magnetic card.
Figure 40:
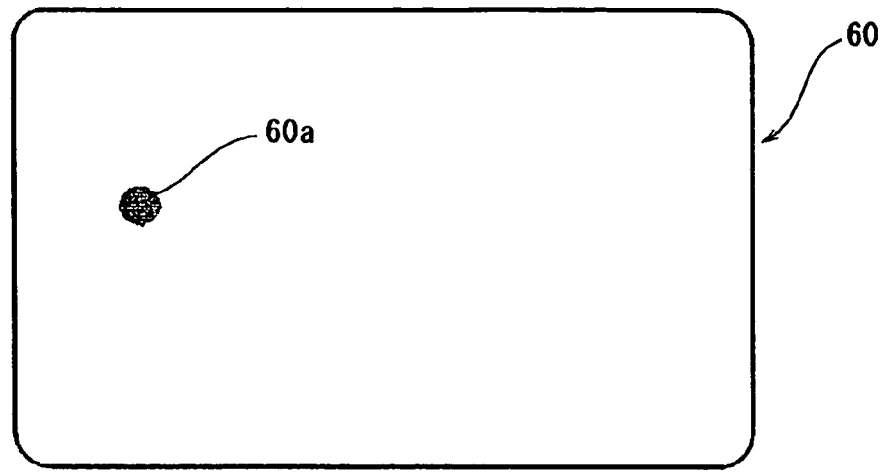
FIG. 40 is an explanatory plan view showing a minimum connection area between an antenna section and a chip provided in contactless IC card.
Figure 41:
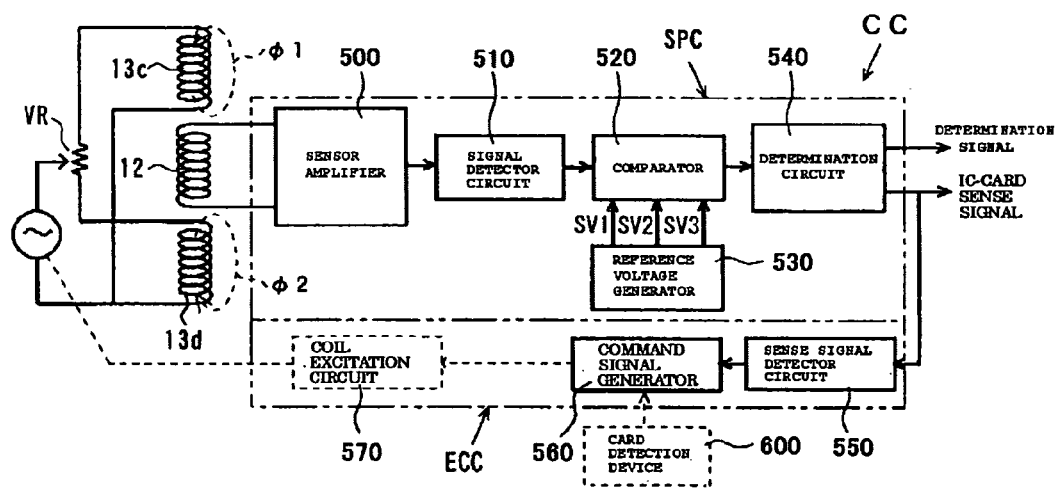
FIG. 41 is a circuit block diagram showing a control circuit section by way of wire-disconnection diagnostic means according to the present invention.

In the embodiment shown in FIG. 31, the effective technique to sense the contact terminal portion 3b of the IC card 3 or the antenna section of the contactless IC card is to perform the detection by setting the reference value (slice level) higher than the temperature variation of the output voltage from the inlet sensor 20, 10, 40. In this case, the temperature variation of the output voltage from the magnetic differential sensor 10, 40 is very small, so that the magnetic differential sensors can be imparted with high sensitivity. More specifically, the relationship between the output voltage from the magnetic differential sensor 10, 40 and the distance between the magnetic differential sensor 10, 40 and the card side is now viewed. For example, as shown in FIG. 38, it can be known that an excellent sense output can be obtained by appropriately setting the reference value (slice level) while the output voltage (vertical axis in FIG. 38) from the magnetic differential sensor 10, 40 is inversely proportional to the distance (horizontal axis in FIG. 38) between the magnetic differential sensor 10, 40 and the card side.

Figure 25:
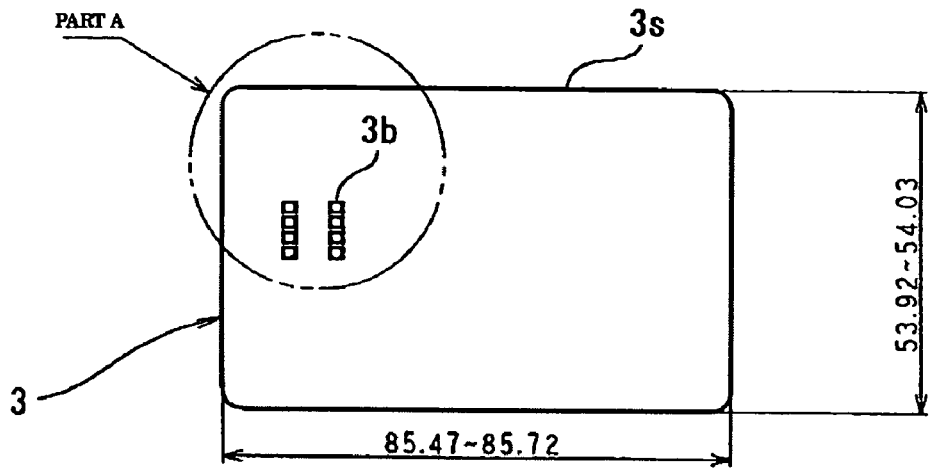
FIG. 25 is an explanatory plan view showing the position of a contact terminal portion provided in an IC card.
Figure 26:
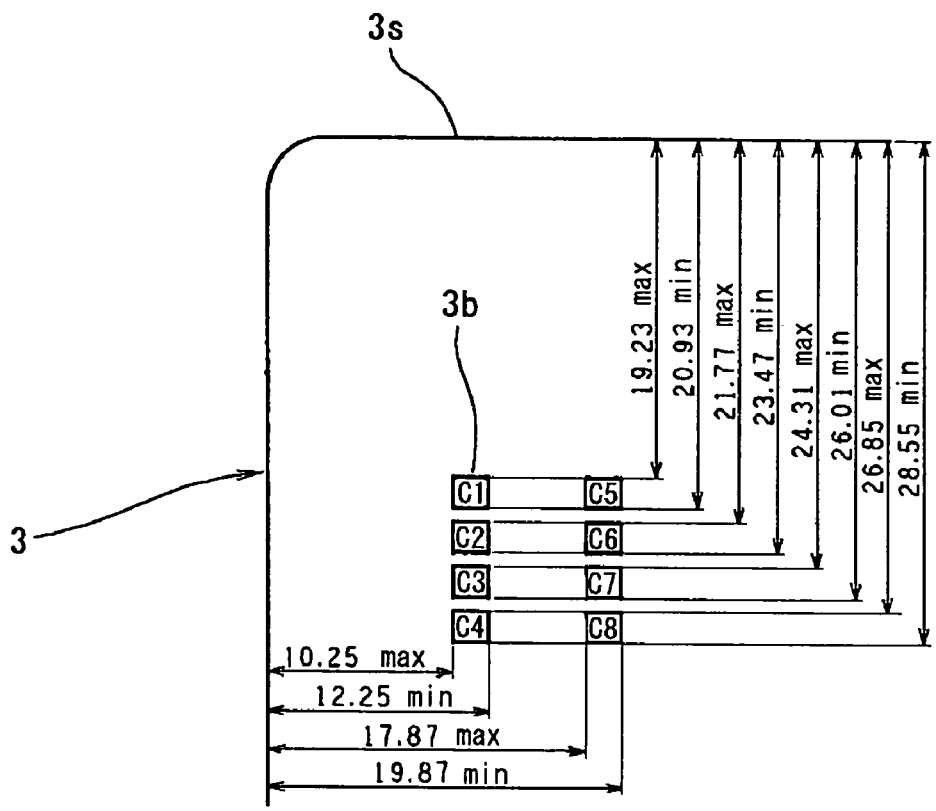
FIG. 26 is an enlarged view of an A section shown in FIG. 25.
Figure 27:
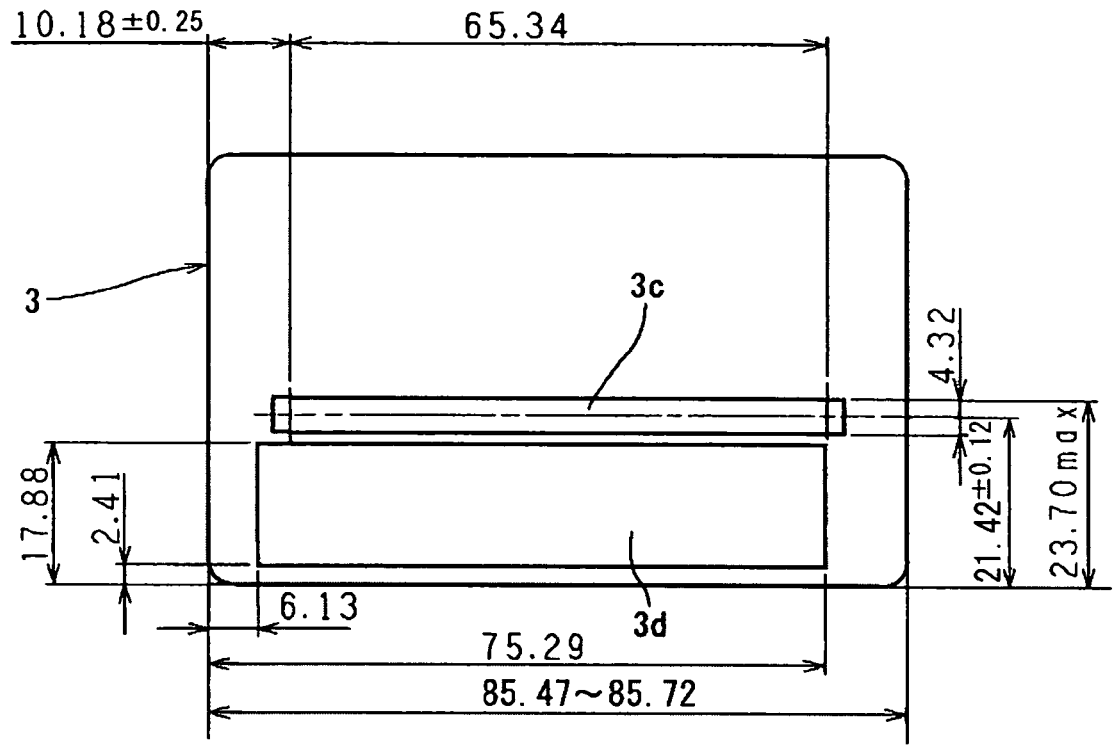
FIG. 27 is an explanatory plan view showing the position of an embossed region provided in the IC card.

In addition, the inlet sensor 10 described above is disposed to be capable of sensing the obverse and reverse sides of IC cards 3 corresponding to the standardized sizes of the IC cards 3 shown in FIGS. 25 to 27.

More specifically, contact terminal portions 3b of IC cards 3 shown in FIG. 25 are standardized by, for example, ISO 7816, as shown in FIG. 26, for the positions from a card upper edge (reference edge) 3s. The individual sizes in the drawing are shown in the units of "mm", and "max" in the drawing represents an upper limit value, and "min" represents a lower limit value.

In addition, for the IC card 3, embossed regions in which embossed characters and the like are formed are standardized, as shown in FIG. 27 for example. More specifically, the embossed regions formed in the IC card 3 have a first region 3c and a second region 3d with individual standardized sizes as shown in the drawing. However, there is no case where the contact terminal portion 3b of the IC card 3 is provided to overlap the individual embossed regions 3c and 3d.

Figure 17:
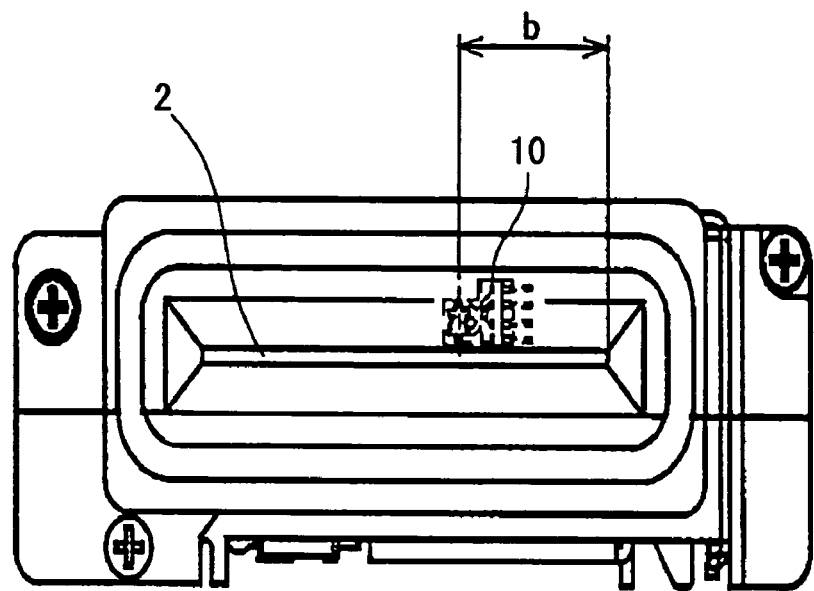
FIG. 17 is an explanatory front view of the card insertion slot portion shown in FIG. 15.
Figure 18:
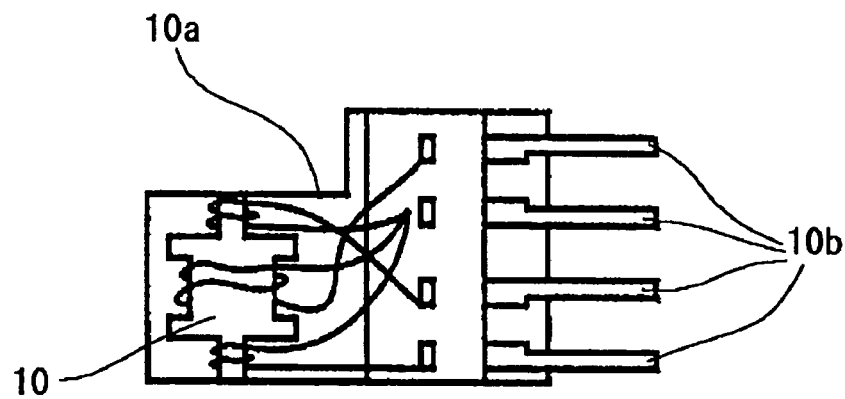
FIG. 18 is an explanatory vertical sectional view showing an example inlet sensor used in the IC card reader shown in FIG. 13.
Figure 19:
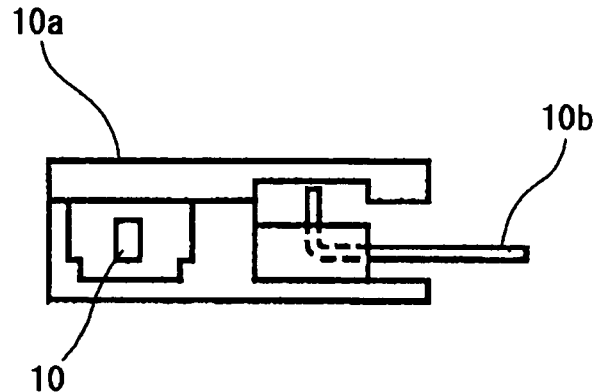
FIG. 19 is an explanatory transverse sectional view of the inlet sensor shown in FIG. 18.
Figure 28:
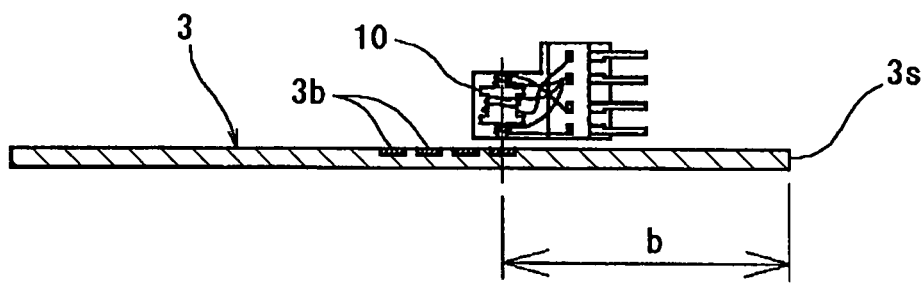
FIG. 28 is an explanatory front view showing a state where the IC card is appropriately inserted with its obverse side being faced up.
Figure 29:
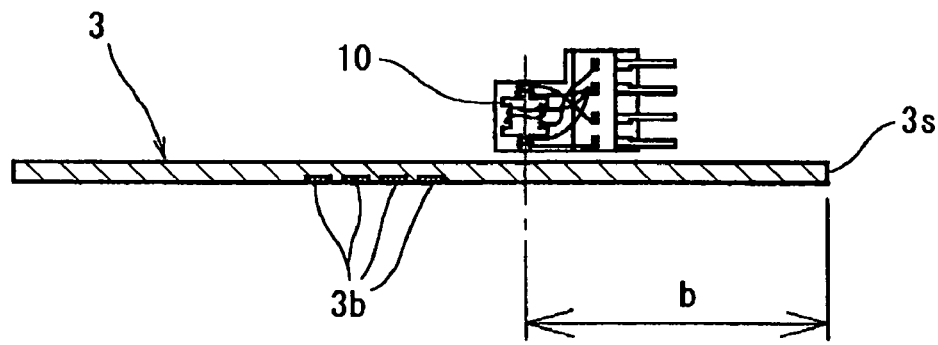
FIG. 29 is an explanatory front view showing a state where the IC card is inappropriately inserted with its reverse side being faced up.

In accordance with the individual standards regarding the positions of the contact terminal portions 3b of the IC cards 3, in the present embodiment, the center position of the IC card 3 is set to a range of from an appropriate distance b from the card upper edge (reference edge) 3s of the IC card 3 (b=23.7 mm in FIGS. 17, 28, and 29), whereby the obverse and reverse sides of the IC card 3 are detected. More specifically, in the present embodiment, as shown in FIGS. 28 and 29, a center position SC of the inlet sensor 10 is set to a position of 20.08 (=b) mm from the card upper edge (reference edge) 3s of the IC card 3. In this case, for example, as shown in FIG. 28, when the IC card 3 is normally inserted 8 in the "obverse" state, the contact terminal portion 3b is sensed by the inlet sensor 10. However, as shown in FIG. 29, the IC card 3 is inappropriately inserted in the "reverse" state, the contact terminal portion 3b of the IC card 3 is not sensed by the inlet sensor 10 or as the contact terminal portion 3b is positioned at a long distance from the inlet sensor 10.

For the inlet sensor 10 as described above, a gap center position of the magnetic pre-head 20 in the card insertion direction is set substantially identical to the distance to the contact terminal portion 3b from the leading edge 3a of the IC card 3 in the insertion direction. Thereby, the sense direction of the information recording section is made substantially identical to the sense direction of the contact terminal portion 3b whereby to perform smooth detection operation.

In the embodiment shown in FIG. 31, first, second, and third magnetic sensors 20, 10, and 40, as described above, are disposed corresponding to standardized sizes of magnetic card and IC cards shown in FIGS. 39, 25, 27, and 40. More specifically, the first magnetic pre-head 20 is disposed corresponding to a position standard (ISO 07821-2) for a magnetic stripe 50a of a magnetic card 50 shown in FIG. 39. If a detection signal can be received from the first magnetic pre-head 20, the function can be set to determine that a card having the magnetic stripe 50a has been received.

The second magnetic sensor 10 is disposed corresponding to at least one of position standards (ISO 7816) C1 to C8 for contact terminal portions 3b of contact IC cards 3 shown in FIGS. 25 and 27. However, in the disposed region of the second magnetic sensor 10, a minimum connection area 60a for connection with an antenna section and a chip in a contactless IC card 60 shown in FIG. 40. As such, the second magnetic sensor 10 is disposed in the position also corresponding to a position standard (ISO 14443-2) for the projection portion 60a. Accordingly, if a detection signal can be received from the second magnetic sensor 10, the function can be set to determine that any one of a contactless IC card 60 and a contact IC card 3 has been received.

For example, in the present embodiment, the third magnetic sensor 40 is disposed in a position enabling the detection of the antenna section disposed in such a manner as to be routed around the entirety of the contactless IC card 60. For example, this sensor is disposed in a position corresponding to a portion of the antenna section extending along the longitudinal direction of the contactless IC card. The antenna section of the contactless IC card is not standardized by, for example, ISO standards, but is individually standardized for each system and card, so that the third magnetic sensor 40 is appropriately disposed corresponding to each position of each antenna section. Consequently, if a detection signal is received from the third magnetic sensor 40, the function can be set such that the contactless IC card 60 has been received.

Upon receipt of individual detection signals from the first magnetic pre-head 20, second magnetic sensor 10, and third magnetic sensor 40, the type of an inserted card can be determined as described hereunder.

(1) When a detection signal only from the first magnetic pre-head 20 has been received, the function determines that a "magnetic card" has been inserted.

(2) When no detection signal from the third magnetic sensor 40 has been received, but a detection signal only from the second magnetic sensor 10 has been received, the function determines that a "contact IC card" has been inserted.

(3) When both detection signal from the second magnetic sensor 10 detection signal from the third magnetic sensor 40 have been received, the function determines that a "contact IC card" has been inserted.

(4) When no detection signal from the third magnetic sensor 40 has been received, but detection signals from both the first and second magnetic sensors 20 and 10, a "magnetic/contactless IC common card" has been inserted.

(5) When detection signals from all the first, second, and third magnetic sensors 20, 10, and 40 have been received, the function determines that a "magnetic/contactless common card" has been inserted.

From the above, if an unusable card has been inserted, an operation such as a control operation for closing the shutter means 30 can be implemented.

Figure 30:
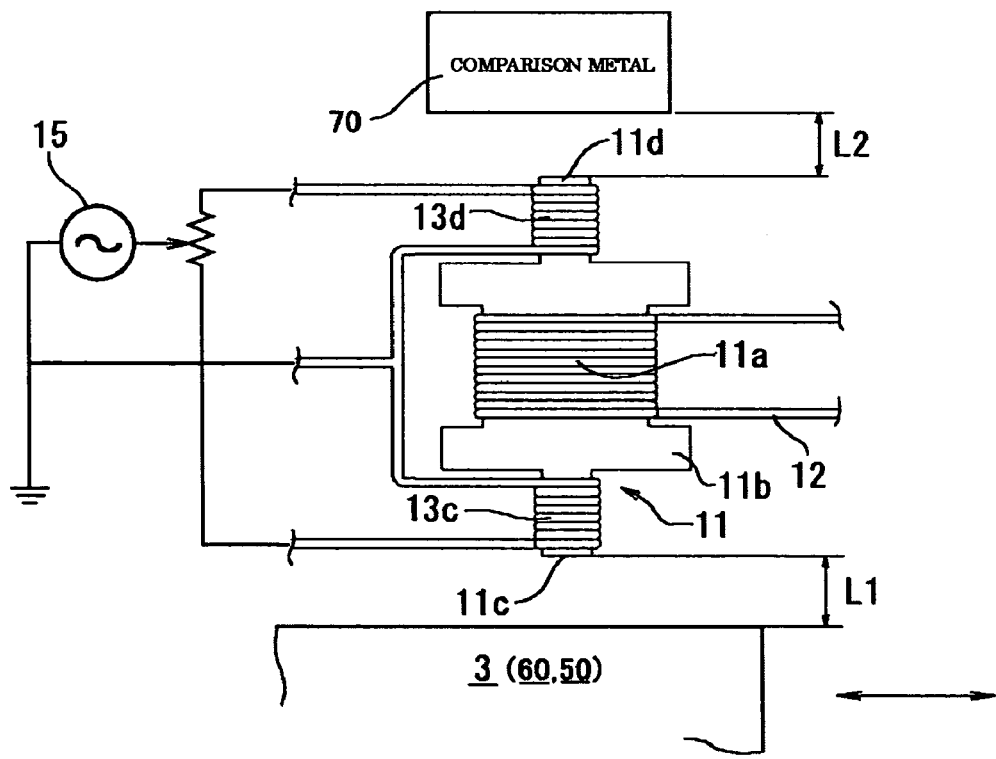
FIG. 30(a) is an explanatory side view showing the schematic configuration of an inlet sensor according to another embodiment of the present invention.
FIG. 30(b) is a diagram showing an adjusted state of a detection range of the inlet sensor shown in FIG. 30(a).
Figure 30:
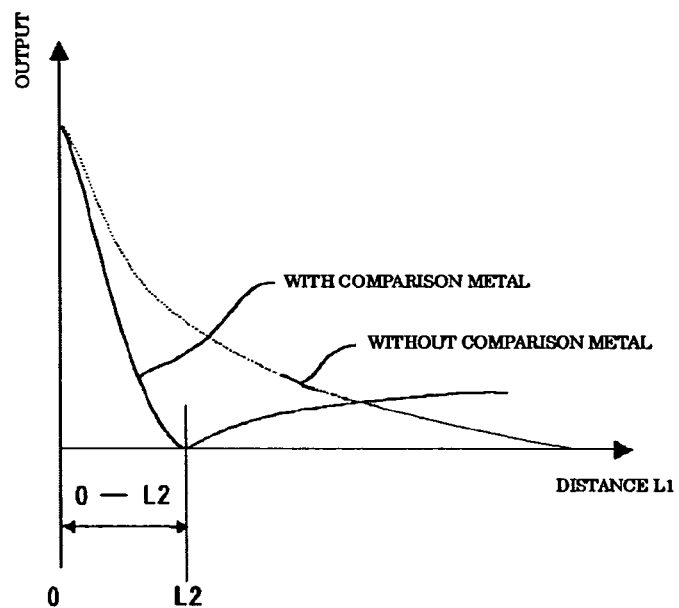

In another embodiment shown in FIG. 30(a) in which the same reference characters are used for the same components (the embodiment shown in FIG. 31 includes also the magnetic card 50 and the contactless IC card 60), of axial-end core sections 11c and 11d in a pair, the axial-end core section 11c on the one side on the one side is disposed on the lower side as viewed in the drawing to face the contact terminal portion 3b of the IC card 3 (card side in the embodiment shown in FIG. 31). Concurrently, the axial-end core section 11d on the other side is disposed on the upper side as viewed in the drawing to face a comparison metal body 70 of the same material as the contact terminal portion 3b of the IC card 3 (card side in the embodiment shown in FIG. 31) or of a material that has an electric conductivity at a level equivalent to that of the contact terminal portion 3b of the IC card 3 (card side in the embodiment shown in FIG. 31) or that has a magnetic permeability at a level equivalent to that of the contact terminal portion 3b of the IC card 3.

The configuration is arranged such that when the contact terminal portion 3b of the IC card 3 (card in the embodiment shown in FIG. 31) is moved in the left-right direction, as viewed in the drawing, to face and leave away from the inlet sensor 10 (magnetic differential sensor 10 (or 40) in the embodiment shown in FIG. 31), the axial-end core section 11c on the one side is brought to face and leave away from the contact terminal portion 3b of the IC card 3 (card in the embodiment shown in FIG. 31), whereby a distance L1 between these two members is variable between a finite value and an infinite value. In this event, the axial-end core section 11d is maintained at a predetermined position without changing a distance L2 with respect to the comparison metal body 70.

Accordingly, the output from the detecting coil 12 becomes "0" at a position at which the distance L2 between the comparison metal body 70 and the axial-end core section 11d on the other side becomes equal to the distance L1 between the axial-end core section 11c on the one side and the contact terminal portion 3b of the IC card 3 (card side in the embodiment shown in FIG. 31). As such, a high detection output can be obtained to sense the presence or absence of the contact terminal portion 3b of the IC card 3 (card in the embodiment shown in FIG. 31) when the axial-end core section 11c on the one side and the distance L1 in which the contact terminal portion 3b of the IC card 3 (card side in the embodiment shown in FIG. 31) is detected is set to the range of the same distance as or less than the distance L2 between the comparison metal body 70 and the axial-end core section 11d on the other side ($0 \leq L1 \leq L2$).

As described above, according to the inlet sensor 10 (magnetic differential sensor 10 (or 40) in the embodiment shown in FIG. 31) of the present embodiment, the differential between the detection output from the contact terminal portion 3b of the IC card 3 (card side in the embodiment shown in FIG. 31) and the detection output detection output from the comparison metal body 70 is used as a variation amount. Accordingly, in a detection range necessary for the contact terminal portion 3b of the IC card 3 (card in the embodiment shown in FIG. 31) which the range is shown by reference characters 0 to L2, the position L2 at which the output becomes "0" can be used by being arbitrarily changed by changing the distance L2 between the comparison metal body 70 and the axial-end core section 11c, the material of the comparison metal body 70, and the like. Consequently, the detection accuracy can be enhanced by obtaining a high output for the presence or absence of the contact terminal portion 3b of the IC card 3 (card in the embodiment shown in FIG. 31).

Further, in the embodiment shown in FIG. 42, the inlet sensor 10 (magnetic differential sensor 10, 40 shown in FIG. 31) ("inlet sensor 10", hereafter) is controlled by the control circuit section CC for the excitation of the excitation coils 13c and 13d, and detection signals to be output from the detecting coil 12 are processed thereby. The control circuit section CC senses the propriety of an IC card 3 by using the sense signal output from the detecting coil 12. This control circuit section is configured of a signal processor circuit SPC that detects wire disconnection in the inlet sensor 10, and an excitation controller circuit ECC that controls the excitation of the excitation coils 13c and 13d.

The signal processor circuit SPC has a sense amplifier 500 that amplifies the output signal output from the detecting coil 12; a signal detector circuit 510 that converts an output signal of the sense amplifier 500 into an IC card detection signal at the DC voltage; a comparator 520 that compares an output voltage of the signal detector circuit 510 and a reference voltage supplied by a reference voltage generator 530; and a determination circuit 540 that determines an output signal of the comparator 520 whereby to output an IC card sense signal which senses a proper IC card 3, and concurrently senses wire disconnection in the inlet sensor 10 whereby to output a wire-disconnection determination signal.

The excitation controller circuit ECC has a sense signal detector circuit 550 that detects that the IC card sense signal is not output; a command signal generator 560 that determines the timing and time width for exciting the excitation coils 13c and 13d by using an output signal of the sense signal detector circuit 550; and a coil excitation circuit 570 that excites the excitation coils 13c and 13d by using an output signal of the command signal generator 560.

As described above, upon insertion of an IC card 3 into the card insertion slot 2, the width of the IC card 3 is sensed by the card detection device 600 formed of, for example, a microswitch provided upstream of the inlet sensor 10 in the insertion direction of the IC card 3. In the event of a proper IC card 3, the card detection device 600 turns ON thereby to detect a sense signal. The sense signal is output to the command signal generator 560, and a trigger for exciting the excitation coils 13c and 13d is in turn supplied to the coil excitation circuit 570. The coil excitation circuit 570 excites the exciting current having an excitation frequency of 1 MHz by causing the current to flow to the excitation coils 13c and 13d. In this case, the exciting current is set to, for example, 20 mApp (0.65 V).

Thereafter, when the contact terminal portion 3b of the IC card 3 comes close to the inlet sensor 10, eddy currents occurring in the contact terminal portion 3b of the IC card 3 are varied. Thereby, the balance between the reverse-directional opposed magnetic fields $\phi 1$ and $\phi 2$ is lost, whereby a differential output can be obtained from the detecting coil 12 in accordance with a magnetic field equivalent to the difference of absolute values ($|\phi 1|-|\phi 2|$) of opposed magnetic fields $\phi 1$ and $\phi 2$. The output signal is amplified by the sense amplifier 500 and is then converted by the signal detector circuit 510 signal detector circuit 51 to a DC current. The DC voltage is applied to the comparator 520 and compared with a first reference voltage SV1. According to the comparison, if the differential output from the detecting coil 12 represents the propriety, an IC card sense signal is output from the determination circuit 540 as a result of having sensed a proper IC card 3.

Then, when the contact terminal portion 3b of the IC card 3 is spaced away from the inlet sensor 10, the differential output from the detecting coil 12 becomes "0", and concurrently, the IC card sense signal becomes "0". This event is, therefore, detected by the sense signal detector circuit 550, and the excitation of the excitation coils 13c and 13d is terminated in response to a command from the command signal generator 560.

As described above, the inlet sensor 10 is configured into the magnetic differential type in which the detecting coil 12 is wound around the central core portion 11a of the core body 11, and the excitation coils 13c and 13d are respectively wound around individual axial-end core portions 11c and 11d in the pair integrally connected. Since the inlet sensor 10 is configured to be small, the detecting coil 12 and the excitation coils 13c and 13d are wound using thin wire materials. As such, any one of the coils can cause wire disconnection during frequent use. In addition, deficiency in solder bonds can occur connecting the individual terminal plates 10b to coils and the circuit control sections by being relayed or wire disconnection of lead wires connecting the circuit control sections and the individual terminal plates 10b. Wire disconnection of the type described above in the inlet sensor 10 and the like is detected by wire-disconnection diagnostic means.

The wire-disconnection diagnostic means is configured of the signal processor circuit SPC and the excitation controller circuit ECC. The wire disconnection in the each individual coil provided in the inlet sensor 10, or the wire disconnection, detachment, or the like in the lead wire to be connected to the inlet sensor 10 is executed with timing when the inlet sensor 10 is not sensing the contact terminal portion 3b of the IC card 3. The above-described timing is set to timing with which the IC card 3 is returned to the card insertion slot 2 after termination of processing of the IC card 3 or the sensor turns OFF when the IC card 3 has passed through the card detection device 600. Signals are applied to the command signal generator 560 with that timing as a trigger. The command signal generator 560 causes the coil excitation circuit 570 to operate during a predetermined time whereby to drive the exciting current to flow into the excitation coils 13c and 13d.

At this time, suppose that wire disconnection or detachment takes place with one of the excitation coils 13c and 13d in the pair or the lead wires connected to these coils. In this case, since the coil on one side is not excited, one of the opposed magnetic fields ϕ1 and ϕ2 is not generated and hence the balance is lost, consequently enabling a differential output at high voltage to be obtained from the detecting coil 12. The signal of the differential output is converted into a DC voltage through the sense amplifier 500 and the signal detector circuit 510 and applied to the comparator 520. The comparator 520 compares the received voltage with a second reference voltage SV2. If the differential output from the detecting coil 12 is higher than the second reference voltage SV2, the determination circuit 540 detects that, for example, one of the excitation coils 13c and 13d in the pair has caused wire disconnection, and outputs a determination signal. When the determination signal is output, an alarm is generated from the IC card reader whereby to perform control not to allow an IC card 3 to be inserted into the card insertion slot 2 thereafter.

Subsequently, in the event that wire disconnection or detachment has taken place with both of the excitation coils 13c and 13d in the pair or with the lead wires connected to these coils, both of the coils are not excited, so that the differential output from the detecting coil 12 becomes "0". As such, the determination circuit 540 determines the differential output from the detecting coil 12 cannot be obtained despite the fact that the excitation coils 13c and 13d in the pair are excited through the coil excitation circuit 570 operated by the command signal generator 560, and a determination signal is output.

In addition, in the event that wire disconnection or detachment has taken place with the detecting coil 12 or with the lead wires connected to the coil, the differential output from the detecting coil 12 becomes "0" despite the fact that the excitation coils 13c and 13d in the pair are excited through the coil excitation circuit 570 operated by the command signal generator 560. However, the event that the differential output from the detecting coil 12 cannot be obtained is identical to the event that wire disconnection has taken place with both of the excitation coils 13c and 13d in the pair or the like has caused, so that the event of the wire disconnection in the detecting coil 12 or the like cannot be determined.

As such, the function of determining the wire disconnection of the detecting coil 12 or the like is imparted to the wire-disconnection diagnostic means. That is, in the inlet sensor 10 configured into the magnetic differential type, the detecting coil 12 is wound around the central core portion 11a of the core body 11, and the excitation coils 13c and 13d are respectively wound around individual axial-end core portions 11c and 11d in the pair integrally connected. Thereby, the balance between the reverse-directional opposed magnetic fields ϕ1 and ϕ2 is lost, whereby the differential output can be obtained in accordance with a magnetic field equivalent to the difference of absolute values (|ϕ1|−|ϕ2|) of opposed magnetic fields ϕ1 and ϕ2. However, the axial-end core sections 11c and 11d in the pair of the core assembly 11 on which the respective excitation coils 13c and 13d are wound have slight nonuniformity in dimensional accuracy. Consequently, since a differential occurs also between the opposed magnetic fields ϕ1 and ϕ2, a low standby-time voltage is output from the detecting coil 12.

Normally, the standby-time voltage is set close to "0" by changing the exciting current applied by a volume VR to the individual excitation coils 13c and 13d. However, in the present invention, the balance between the reverse-directional opposed magnetic fields ϕ1 and ϕ2 to be generated by exciting the excitation coils 13c and 13d is set with slight nonuniformity, whereby the low standby-time voltage is output from the detecting coil 12 even in a standby mode.

Accordingly, the event that the detecting coil 12 or the like has caused wire disconnection can be determined from the fact that the standby-time voltage is "0". More specifically, in the event that the detecting coil 12 or the like has caused wire disconnection, no standby-time voltage is output from the detecting coil 12 despite the excitation of the excitation coils 13c and 13d. The standby-time voltage is applied to the comparator 520 and compared with a third reference voltage SV3. If the standby-time voltage is lower than the reference voltage, wire disconnection in the detecting coil 12 or the like is detected by the determination circuit 54, and a determination signal is output. The third reference voltage SV3 is set slightly lower than the standby-time voltage.

With the wire-disconnection diagnostic means described above, wire disconnection in the excitation coils 13c and 13d, the detecting coil 12, or in the lead wire connected to these coils, or wire disconnection in a communication path such as a connection to a terminal can be detected by the output signal from the detecting coil 12. Further, a wire disconnection location can be substantially identified.

The timing of diagnosis may be set to the timing with which, as described above, the wire disconnection diagnosis is performed when the IC card 3 is returned to the card insertion slot 2; or the operation may be performed during the time before the sensor 10 senses the contact terminal portion 3b. Alternatively, the operation may be executed with an arbitrary timing, inasmuch as the sensor 10 is not performing sensing of the contact terminal portion 3b in the timing period. The wire-disconnection diagnosis may be executed each time an IC card 3 is inserted or is returned, but may be executed alternately every five or ten times.

While the embodiments of the present invention made by the present inventor have been described as above in detail, the present invention is not limited to the embodiments; and needless-to-say, various modifications and alterations may be made without departing the spirit and scope of the present invention.

For example, although three magnetic sensors are disposed in the embodiments, there are cases where similar operations and advantages can be obtained with two magnetic sensors depending on the apparatus configuration. Consequently, it is sufficient for the present invention to have at least two magnetic sensors.

As another example, in the inlet sensor 10 (magnetic differential sensor 10, 40) according to the each individual embodiment described above, the excitation coils 13c and 13d are disposed on two sides with the detecting coil 12 being interposed in the central portion. However, detecting coils may be disposed on two sides with an excitation coil being interposed in the central portion.

As another example, in the inlet sensor 10 (magnetic differential sensor 10, 40) according to each individual embodiment, the width dimension of the axial-end core section 11c is smaller than the width dimension of the central core portion 11a (W2<W1). However, the width dimensions of the two may be set equal to each other or to the opposite dimensional relationship, for example. Further, in the central core portion 11a of the core body 11 in the each individual embodiment, the portion on which the detecting coil 12 is wound is provided with the recessed cutout portion. However, the portion may be formed into a simple rectangular form without provision of the cutout portion.

Further, in the inlet sensor 10 (magnetic differential sensor 10, 40) according to each individual embodiment, although the single thin-plate shaped member is used for the core body, three-dimensional core bodies 11' and 11" shown in FIGS. 8(a) and 8(b) may be used in a manner similar to the above. Also in this case, the core body may be formed into a simple form without forming a cutout-like recessed portion 11'a, 11" provided in the axially central portion. In addition, two or more thin plate members having the same shape may be adhered.

Further, according to the each individual embodiment, the excitation coils 13c and 13d in the pair are serially and integrally connected in a serial state. However, as is shown in FIG. 9, the excitation coils 13c and 13d are connected in a parallel state to the AC power supply 15 whereby to enable forming opposed magnetic fields.

Further, according to the each individual embodiment, the single excitation power supply is provided alone. However, separate power supplies may be disposed for the individual excitation coils 13c and 13d. In this case, however, the power supplies should be set so that the phases thereof are synchronized.

A case can be contemplated in which the width dimensions W2 and W2 of the axial-end core sections 11c and 11d in the pair in the embodiment are made slightly different by, for example, 5 μm because of manufacturing error, and consequently, the differential output when no detection target object is present does not become "0". In this case, the electric current value to be supplied to the excitation coils 13c and 13d may be offset-adjusted thereby to cause the differential output to "0", whereby the problem can easily be addressed.

Further, the sensor such as the inlet sensor (magnetic differential sensor) is not limited to the magnetic differential type, but an eddy current sensor, an optical sensor, or the like may be used in a similar manner.

Further, while the each individual embodiment has been described with reference to the embodiment of the card reader in which the IC card is automatically transported, the present invention may be enforced with card readers of a manual card transport type.

INDUSTRIAL APPLICABILITY OF THE INVENTION

As described above, the present invention can be suitably employed for a wide variety of apparatuses including apparatuses for identifying irregular surfaces and materials of coins not only in coin-handling apparatuses, such as automatic vending machines, automatic ticket vending machines, and ATMs, but also motor rotation drive control apparatuses and the like.

The invention claimed is:

1. An IC card reader configured to bring an IC contact into contact with a contact terminal portion of an IC card inserted into an apparatus mainbody and transported to a read/write position whereby to perform recording/reproduction of information on the IC card, the IC card reader comprising:
    an inlet sensor for sensing the contact terminal portion of the IC card to detect validity of each inserted card is provided in an appropriate position on a more upstream side than the read/write position in an insertion direction of the IC card;
    wherein the inlet sensor is configured into a magnetic differential type wherein an excitation coil and a detection coil are mounted by being individually wound on a same axial center of a core body;
    wherein one side of the excitation coil and the detection coil is mounted in a central core portion located in a substantially center in the axial direction of the core body, and the other side of the excitation coil is mounted on individual axial-end core portions in a pair located in both end portions of the core body in the axial direction; and
    wherein one side of the axial-end core portions in the pair and the detection target object have a locational relationship to be mutually faceable.
2. The IC card reader according to claim 1,
    wherein in the apparatus mainbody there are provided a card insertion slot into which the IC card is inserted, a card transport path for guiding the IC card inserted through the card insertion slot to the read/write position, a transport driving means for moving the IC card present in the card transport path, and a shutter means for closing/opening the card transport path on a downstream side of the card insertion slot in the insertion direction of the IC card; and
    wherein the inlet sensor is located between the card insertion slot and the shutter means.
3. The IC card reader according to claim 2,
    wherein the inlet sensor is mounted in a position spaced away from the card transport path.
4. The IC card reader according to claim 1,
    wherein the inlet sensor is located in an appropriate positional relationship with the contact terminal portion to be able to sense obverse and reverse sides of the IC card.
5. The IC card reader according to claim 1,
    wherein a distance between a gap center of a magnetic head provided to sense a magnetic information record section and the inlet sensor is set substantially equal to a distance from a leading edge position of the IC card in the insertion direction to the contact terminal portion.
6. The IC card reader according to claim 1,
    wherein the core body is formed of a single plate-shaped member.
7. The IC card reader according to 1,
    wherein a width dimension of the axial-end core portion in a direction perpendicular to the axial direction is set smaller than a width dimension of the central core portion.
8. The IC card reader according to claim 7,
    wherein engagement flange portions protruding in the width direction are individually provided in individual boundary portions between the central core portion and the axial-end core portions in the pair; and wherein winding positions of the excitation coil and the detection coil are positioned and regulated by the engagement flange portions to a predetermined position.

9. The IC card reader according to claim 7, wherein a comparison metal body is located to oppose the axial-end core portion, which is one of the axial-end core portions in the pair, in the axial-end core portion on the opposite side of the side located faceably with the side of the IC card as the detection target object.

10. The IC card reader according to claim 1, wherein a width dimension of the axial-end core portion is set to be half or smaller than the width dimension of the central core portion.

11. The IC card reader according to 1, wherein the excitation coil comprises coil winding portions in a pair; and
wherein the coil winding portions in the pair are located to form opposed magnetic fields on the same axial center.

12. An IC card reader configured to perform recording/reproduction of desired information on an information recording section of a card inserted into an apparatus mainbody and transported to a read/write position, the IC card reader comprising:
an inlet sensor detecting the type of each inserted card is provided in an appropriate position on a more upstream side than the read/write position in an insertion direction of the card;
at least two magnetic sensors of a first magnetic sensor for detecting a magnetic stripe of a magnetic card,
a second magnetic sensor for detecting a contact terminal portion of a contact IC card, and
a third magnetic sensor for detecting an antenna section of a contactless IC card.

13. The IC card reader according to claim 12, wherein in the apparatus mainbody there are provided a card insertion slot into which the card is inserted, a card transport path for guiding the card inserted through the card insertion slot to the read/write position, a transport driving means for moving the card present in the card transport path, and a shutter means for closing/opening the card transport path on a downstream side of the card insertion slot in the insertion direction of the card; and
wherein the inlet sensor is located between the card insertion slot and the shutter means.

14. An IC card reader configured to perform recording/reproduction of desired information on an information recording section of a card inserted into an apparatus mainbody and transported to a read/write position, the IC card reader-comprising:
an inlet sensor detecting the type of each inserted card is provided in an appropriate position on a more upstream side than the read/write position in an insertion direction of the card;
wherein at least one of the inlet sensors is configured into a magnetic differential type wherein an excitation coil and a detection coil are mounted by being individually wound on a same axial center of a core body;
wherein one side of the excitation coil and the detection coil is mounted in a central core portion located in a substantially center in the axial direction of the core body, and the other side of the excitation coil is mounted on individual axial-end core portions in a pair located in both end portions of the core body in the axial direction; and
wherein one side of the axial-end core portions in the pair and the detection target object have a locational relationship to be mutually faceable.

15. The IC card reader according to claim 14, wherein the core body is formed of a single plate-shaped member.

16. The IC card reader according to claim 15, wherein a width dimension of the axial-end core portion is set to be half or smaller than the width dimension of the central core portion.

17. The IC card reader according to claim 14, wherein a width dimension of the axial-end core portion in a direction perpendicular to the axial direction is set smaller than a width dimension of the central core portion.

18. The IC card reader according to claim 17, wherein engagement flange portions protruding in the width direction are individually provided in individual boundary portions between the central core portion and the axial-end core portions in the pair; and
wherein winding positions of the excitation coil and the detection coil are positioned and regulated by the engagement flange portions to a predetermined position.

19. The IC card reader according to claim 17, wherein a comparison metal body is located to oppose the axial-end core portion, which is one of the axial-end core portions in the pair, in the axial-end core portion on the opposite side of the side located faceably with the side of the card as the detection target object.

20. The IC card reader according to claim 14, wherein the excitation coil comprises coil winding portions in a pair; and
wherein the coil winding portions in the pair are located to form opposed magnetic fields on the same axial center.

* * * * *